US011868925B2

(12) United States Patent
Miyazaki et al.

(10) Patent No.: US 11,868,925 B2
(45) Date of Patent: Jan. 9, 2024

(54) INFORMATION PROCESSING APPARATUS, INFORMATION PROCESSING METHOD, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Mariko Miyazaki, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 142 days.

(21) Appl. No.: 17/463,491

(22) Filed: Aug. 31, 2021

(65) Prior Publication Data

US 2022/0277233 A1 Sep. 1, 2022

(30) Foreign Application Priority Data

Mar. 1, 2021 (JP) ................................ 2021-031631

(51) Int. Cl.
*G06Q 10/02* (2012.01)
*G06Q 30/0251* (2023.01)
*G06Q 30/02* (2023.01)

(52) U.S. Cl.
CPC ......... *G06Q 10/02* (2013.01); *G06Q 30/0261* (2013.01); *G06Q 30/0281* (2013.01)

(58) Field of Classification Search
CPC . G06Q 10/02; G06Q 30/0261; G06Q 30/0281
USPC .............................................................. 705/5
See application file for complete search history.

(56) References Cited

U.S. PATENT DOCUMENTS 9,955,318 B1 * 4/2018 Scheper ................. G06Q 10/02
10,664,772 B1 * 5/2020 Poel .................... G06F 3/04842
10,733,371 B1 * 8/2020 Baloga ................. G06Q 10/101
11,167,680 B2 * 11/2021 Glatfelter .................. B60P 7/13
11,176,522 B2 * 11/2021 Fukasawa .............. G06Q 10/10
11,488,115 B1 * 11/2022 Gada ...................... G06Q 10/02
2007/0162315 A1 * 7/2007 Hodges .................. G06Q 10/02 705/7.12
2020/0117326 A1 * 4/2020 Tokuchi ................. G06Q 10/02
2020/0362550 A1 * 11/2020 Schlagel ................ E04F 11/02

FOREIGN PATENT DOCUMENTS

JP 2002049807 2/2002
JP 2004086582 3/2004
JP 2015103231 6/2015

OTHER PUBLICATIONS

"Integrated Information System for reserving rooms in Hotels" Published by International Journal of Advanced Computer Science and Applications (Year: 2011).*

* cited by examiner

*Primary Examiner* — Zeina Elchanti
(74) *Attorney, Agent, or Firm* — JCIPRNET

(57) ABSTRACT

An information processing apparatus includes a processor configured to, in a reservation process of making a reservation for use of a facility, accept input of one purpose of use among plural purposes of use provided for the facility, and in accordance with the accepted purpose of use, change at least one of a function provided in the reserved facility or information for which input is accepted in the reservation process.

8 Claims, 22 Drawing Sheets

10
12
20(70)
23
21
22
COMMUNICATION LINE
18
50(70)
16
53
WIRELESS BASE STATION
51
52
14

INFORMATION PROCESSING APPARATUS, INFORMATION PROCESSING METHOD, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-031631 filed Mar. 1, 2021.

BACKGROUND

(i) Technical Field

The present invention relates to an information processing apparatus, an information processing method, and a non-transitory computer readable medium storing an information processing program.

(ii) Related Art

JP2015-103231A discloses a medical mall management system in which in order to improve the convenience of a patient in a limited space, the number of medical doctors at a level capable of providing various medical services as self-sufficient as possible can be arranged, and further, the burden on the doctor who is eager to start the business to raise funds to start the business can be reduced.

SUMMARY

In the related art, there is a facility that can be used at a time zone designated at the time of a reservation. In this case, it is assumed that a user who uses the facility uses the facility for business use to provide a product or a service to other users, in addition to performing personal work by using the facility.

As described above, in a case in which a plurality of purposes of use of the facility of the user are provided, there is a risk of the occurrence of the inconvenience, such as the inconvenience that other users cannot recognize the business use of the facility or the business use which requires permission is performed without permission in a case in which a process in accordance with the purpose of use is not performed.

Aspects of non-limiting embodiments of the present disclosure relate to an information processing apparatus, an information processing method, and a non-transitory computer readable medium storing an information processing program that execute a process in accordance with a purpose of use input at the time of a reservation for a facility in a case in which the purpose of use of the facility is selected from among a plurality of the purposes of use.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a reservation process of making a reservation for use of a facility, accept input of one purpose of use among a plurality of the purposes of use provided for the facility, and in accordance with the accepted purpose of use, change at least one of a function provided in the reserved facility or information for which input is accepted in the reservation process.

BRIEF DESCRIPTION OF THE DRAWINGS

Exemplary embodiment(s) of the present invention will be described in detail based on the following figures, wherein.

DETAILED DESCRIPTION

Figure 1:
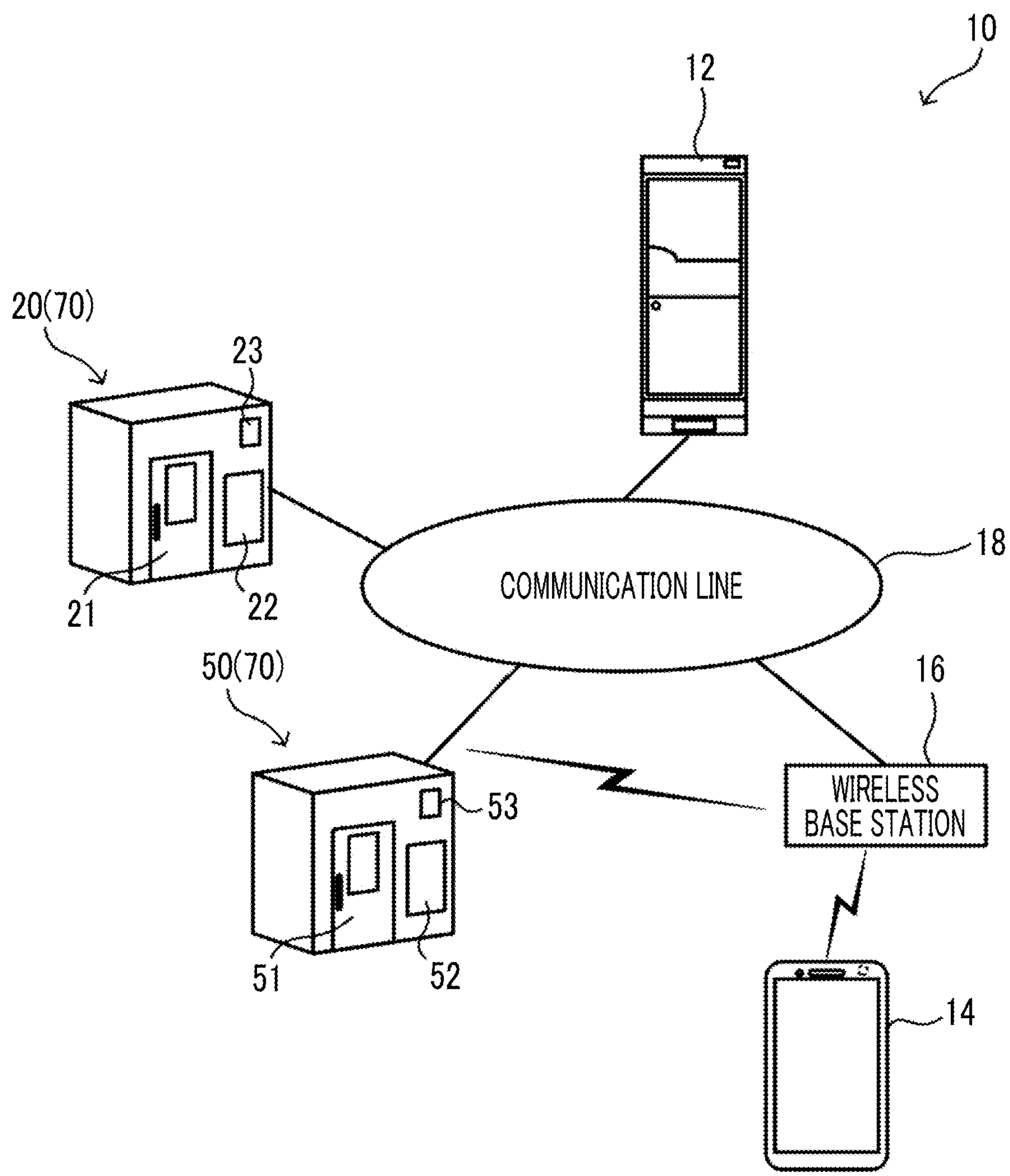
FIG. 1 is a diagram showing a schematic configuration of an information processing system.

Hereinafter, an example of the present exemplary embodiment will be described in detail with reference to the drawings. FIG. 1 is a diagram showing a schematic configuration of an information processing system 10 according to the present exemplary embodiment.

As shown in FIG. 1, the information processing system 10 according to the present exemplary embodiment includes a cloud server 12 as an example of an information processing apparatus, a wireless base station 16, a work booth 70 including a private room 20, a private room 50, and the like. The work booth 70 is an example of a "facility".

The cloud server 12, the wireless base station 16, and the work booth 70 are connected to a communication line 18, respectively.

The cloud server 12 performs a process related to the work booth 70. As an example, the cloud server 12 performs, as a process related to the work booth 70, a reservation process of making a reservation for use of the work booth 70, an unlock process of unlocking a door of the reserved work booth 70, and the like.

The wireless base station 16 is wirelessly connected to a portable terminal device 14, which is portable, such as a smartphone, connects the portable terminal device 14 to the communication line 18, and performs communication with the device connected to the communication line 18. Note that as the portable terminal device 14, a smartphone, a tablet terminal, a laptop PC, a bearable terminal such as an earphone type that performs input and output by voice, various wearable terminals such as a clock type, a glasses type, a wristband type, a clip type, a head-mounted display type, or a strap type, and the like can be applied. In the present exemplary embodiment, the portable terminal device 14 is the "smartphone".

In the present exemplary embodiment, configurations of the private room 20 and the private room 50 in the work booth 70 are different from each other. The configurations of the private room 20 and the private room 50 will be described below.

Figure 2:
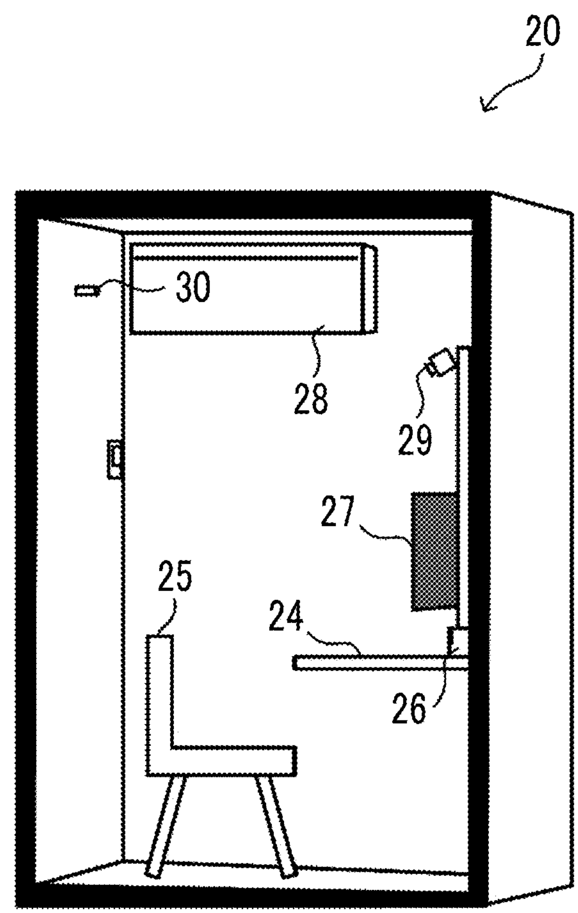
FIG. 2 is a diagram showing a schematic configuration of an inside of a private room.

FIG. 2 is a diagram showing a schematic configuration of an inside of the private room 20. The private room 20 is provided with, as an example, a device necessary for teleworking. As shown in FIG. 2, inside the private room 20, a desk 24, a chair 25, a power outlet 26, an indoor display 27, an air conditioner 28, a camera 29, and a hook 30 are provided. Further, as shown in FIG. 1, outside the private room 20, a door 21, an outdoor display 22, and a lamp 23 are provided.

Figure 3:
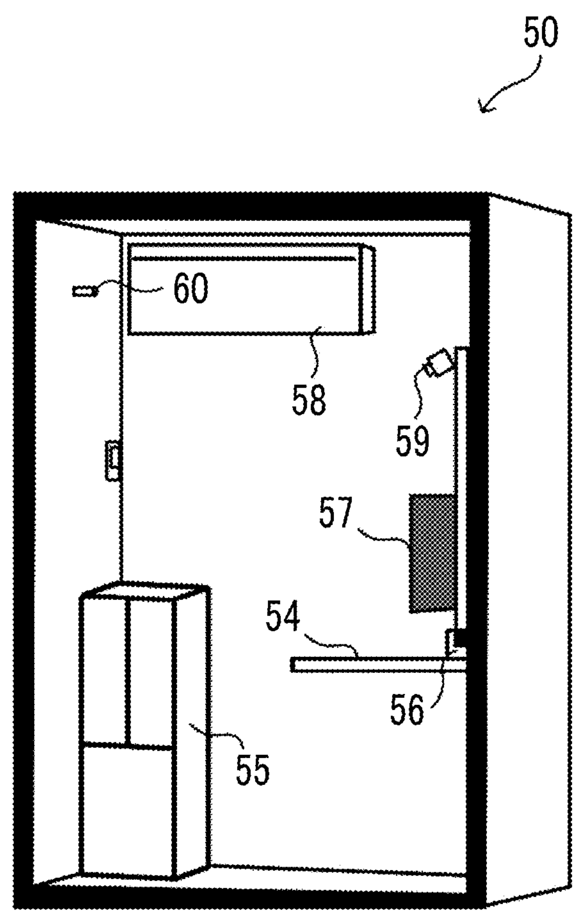
FIG. 3 is a diagram showing a schematic configuration of the inside of the private room.

FIG. 3 is a diagram showing a schematic configuration of an inside of the private room 50. The private room 50 is provided with, as an example, a device necessary for food sale. As shown in FIG. 3, inside the private room 50, a desk 54, a refrigerator 55, a power outlet 56, an indoor display 57, an air conditioner 58, a camera 59, and a hook 60 are provided. Further, as shown in FIG. 1, outside the private room 50, a door 51, an outdoor display 52, and a lamp 53 are provided.

Figure 4:
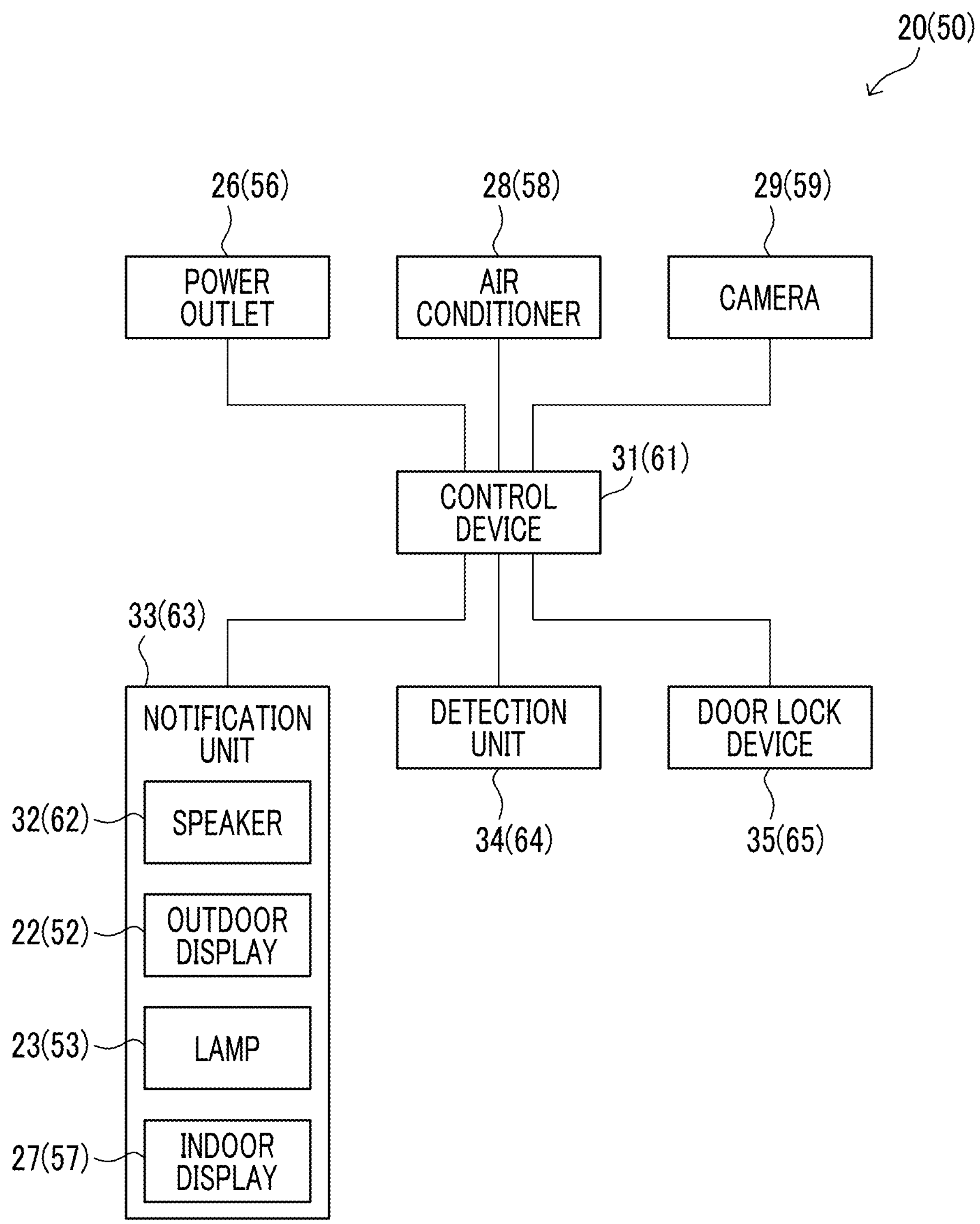
FIG. 4 is a block diagram showing an electrical configuration of the private room.

FIG. 4 is a block diagram showing electrical configurations of the private room. 20 and the private room 50. Note that the electrical configurations of the private room 20 and the private room 50 are basically identical, and thus the private room 20 will be described as a representative.

As shown in FIG. 4, the private room 20 is provided with a control device 31 that controls the operation of the device provided in the private room 20. The control device 31 is connected to a central processing unit (CPU), a read only memory (ROM), a random access memory (RAM), and an input/output interface (I/O), which are not shown, so as to be able to communicate with each other via a bus. Then, the control device 31 performs transmission and reception of various signals from the device connected to the communication line 18 such as the cloud server 12, and controls the operation of each device in response to the acquired various signals. As an example, the control device 31 performs, as the control, supply and shut-off of electric power with respect to each device such as the power outlet 26 and the air conditioner 28.

The power outlet 26, the air conditioner 28, the camera 29, a notification unit 33, a detection unit 34, and a door lock device 35 are connected to the control device 31.

The notification unit 33 includes a speaker 32, the outdoor display 22, the lamp 23, and the indoor display 27.

The speaker 32 outputs various voices. As an example, the speaker 32 outputs information and the like received from the cloud server 12. Further, the speaker 32 includes an internal speaker that outputs various voices to the inside of the private room 20 and an external speaker that outputs various voices to the outside of the private room 20.

The outdoor display 22 displays various pieces of information with respect to the outside of the private room 20. As an example, the outdoor display 22 displays the information and the like received from the cloud server 12.

The lamp 23 turns on light in various lighting patterns and colors. As an example, the lamp 23 turns on light in a lighting pattern and color based on the information and the like received from the cloud server 12.

The indoor display 27 displays various pieces of information with respect to the inside of the private room 20. As an example, the indoor display 27 displays the information and the like received from the cloud server 12.

The detection unit 34 is provided in the door 21 and inside of the private room 20 to detect various pieces of information. A detection content detected by the detection unit 34 is transmitted to the cloud server 12 via the control device 31. The detection unit 34 includes, as an example, sensors such as a photoelectric sensor, a contact sensor, and a vibration sensor. Note that the detection unit 34 may be provided with another sensor in addition to the sensors described above, or may not be provided with a part of the sensors described above. In the present exemplary embodiment, with the configuration of the detection unit 34 described above, an opening and closing operation of the door 21 can be detected or the presence or absence of a person inside the private room 20 can be detected by using the detection unit 34 as a motion sensor.

The door lock device 35 is an electronic lock provided in the door 21 and can be locked and unlocked in accordance with at least an instruction from the cloud server 12. As an example, the door lock device 35 unlocks the door 21 in a case in which an unlock instruction is received from the cloud server 12. Further, as an example, the door lock device 35 locks the door 21 in a case in which a lock instruction is received from the cloud server 12. Further, the door lock device 35 locks or unlocks the door 21 even in a case in which various switches installed inside the private room 20 are operated. Then, in a case in which lock or unlock by the door lock device 35 is performed, the control device 31 transmits the performed contents to the cloud server 12.

Note that in the above description, the electrical configuration of the private room 20 has been described as an example, but in a case of the private room. 50, a control device 61 is connected to the refrigerator 55 (not shown), the power outlet 56, the air conditioner 58, the camera 59, a notification unit 63, a detection unit 64, and the door lock device 65.

Figure 5:
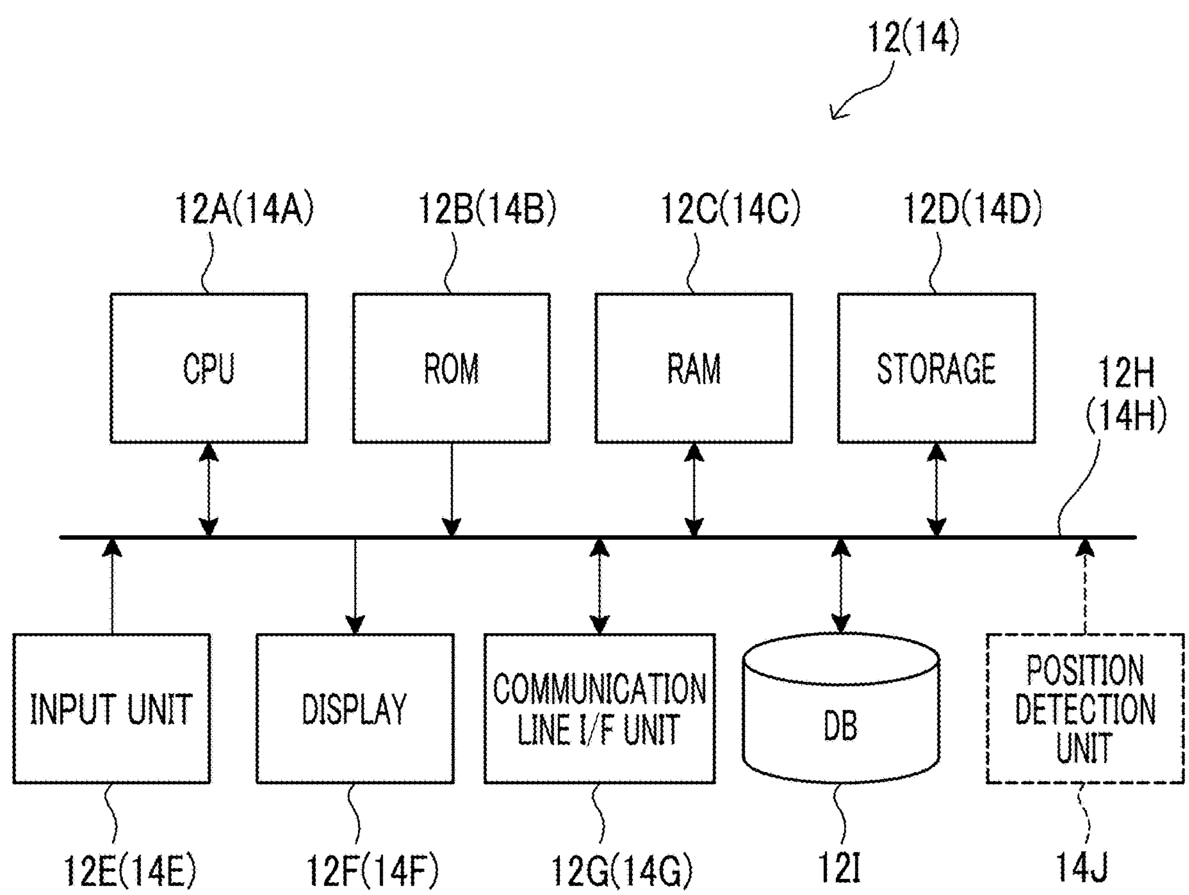
FIG. 5 is a block diagram showing an electrical configuration of a cloud server and a portable terminal device.

Subsequently, the schematic configurations of the cloud server 12 and the portable terminal device 14 will be described. FIG. 5 is a block diagram showing an electrical configuration of the cloud server 12 and the portable terminal device 14. Note that the cloud server 12 and the portable terminal device 14 basically have a general computer configuration, and thus the cloud server 12 will be described as a representative.

As shown in FIG. 5, the cloud server 12 according to the present exemplary embodiment includes a CPU 12A, a ROM 12B, a RAM 12C, a storage 12D, an input unit 12E, a display 12F, and a communication line interface (I/F) unit 12G, as an example of a processor.

The CPU 12A is a central arithmetic processing unit that controls the overall operation of the cloud server 12, and executes various programs and controls each unit. That is, the CPU 12A reads out a program from the ROM 12B or the storage 12D, and executes the program by using the RAM 12C as a work region. The CPU 12A performs control of each of the configurations described above and various arithmetic processes in accordance with the program recorded in the ROM 12B or the storage 12D. In the present exemplary embodiment, the ROM 12B or the storage 12D stores an information processing program for executing at least the reservation process and a change process described below. Note that the information processing program may be installed on the cloud server 12 in advance, or may be stored in a non-volatile storage medium, or distributed via the communication line 18, and appropriately installed on the cloud server 12. Examples of the non-volatile storage medium include a CD-ROM, a magneto-optical disk, a hard disk drive (HDD), a DVD-ROM, a flash memory, a memory card, and the like.

The ROM 12B stores various programs and various pieces of data. The RAM 12C transitorily stores, as the work region, the program or the data. The storage 12D includes a storage device such as the HDD, a solid state drive (SSD), or the flash memory, and stores various programs including an operating system and various pieces of data.

The input unit 12E is used for input of various pieces of information. The input unit 12E includes, for example, a pointing device such as a mouse, various buttons, a keyboard, a microphone, a camera, and the like.

The display 12F is used for display of various pieces of information. Note that the display 12F employs a touch panel system and also functions as the input unit 12E.

The communication line I/F unit 12G is an interface that is connected to the communication line 18 and performs communication with another device connected to the communication line 18. For the communication, a wired communication standard such as Ethernet (registered trademark) or FDDI, or a wireless communication standard such as 4G, 5G, or Wi-Fi (registered trademark) is used, for example.

The respective units of the cloud server 12 described above are electrically connected to each other by a system bus 12H.

In addition, the cloud server 12 includes a database (DB) 121 that stores various pieces of information such as an installation location of the work booth 70 to be managed or reservation information.

In a case in which the information processing program described above is executed, the cloud server 12 uses the hardware resources described above to execute a process based on the information processing program.

Note that the portable terminal device 14 has a configuration in which a CPU 14A, a ROM 14B, a RAM 14C, and the like are provided as an example of the processor, which is basically identical as the cloud server 12 except that a position detection unit 14J indicated by a broken line in FIG. 5 is provided.

The position detection unit 14J detects a current location of the portable terminal device 14. As an example, signals from a global positioning system (GPS) satellite include time data from an atomic clock mounted on the satellite, information on the orbit of the satellite, or the like, and thus the position detection unit 14J receives a radio wave from the GPS satellite, and obtains a distance from the satellite based on a time difference between the transmission and the reception. Then, the current location of the portable terminal device 14 is detected by positioning a position of one point in a space based on the distance from three or more GPS satellites. Note that a method of detecting the current location of the portable terminal device 14 by the position detection unit 14J may use Bluetooth (registered trademark), Wi-Fi (registered trademark), a beacon, and the like instead of or in addition to using the GPS.

Here, in a case in which the work booth 70 is used, a user needs to reserve the work booth 70 from a dedicated WEB site (hereinafter referred to as a "reservation site") by using the smartphone, the personal computer, and the like. Then, the cloud server 12 performs the reservation process of making the reservation for the use of the work booth 70. Note that instead of or in addition to the reservation site described above, a dedicated application may be provided, and the cloud server 12 may perform a process related to the work booth 70 such as the reservation process by an instruction from the application.

Figure 6:
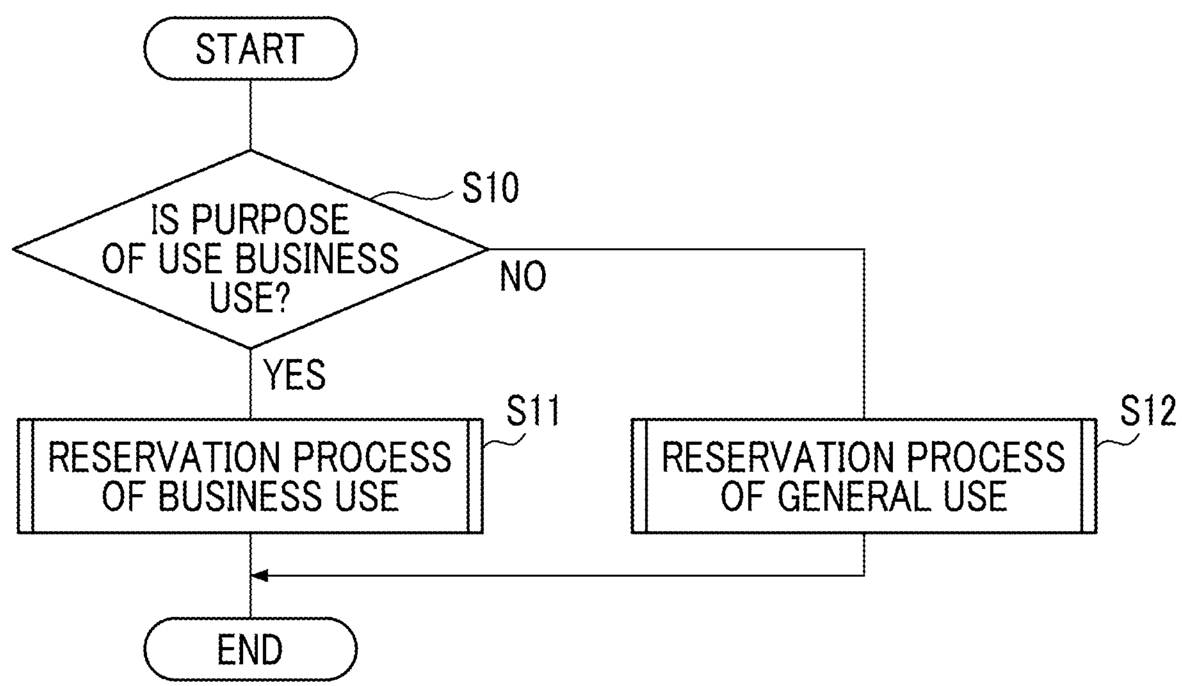
FIG. 6 is a flowchart showing a flow of a reservation process by the cloud server.

FIG. 6 is a flowchart showing a flow of the reservation process of making the reservation for the use of the work booth 70. The CPU 12A reads out the information processing program from the ROM 12B or the storage 12D, develops the read out information processing program in the RAM 12C, and executes the developed information processing program, so that the reservation process is performed by the cloud server 12.

In step S10 shown in FIG. 6, the CPU 12A determines whether or not the purpose of use of the work booth 70 for which the input is accepted is business use for providing a product or a service (hereinafter, referred to as "product or the like") in the work booth 70, and in a case in which the CPU 12A determines that the purpose of use is the business use (step S10: YES), the process proceeds to step S11. On the other hand, in a case in which the CPU 12A determines that the purpose of use is not the business use (step S10: NO), the process proceeds to step S12. The business use is an example of a "first purpose".

In step S11, the reservation process is executed in a case in which the purpose of use of the work booth 70 is the business use. Thereafter, the process is terminated. Note that a process of a subroutine in step S11 will be described below.

In step S12, the CPU 12A executes the reservation process in a case in which the purpose of use of the work booth 70 is general use not for providing the product or the like in the work booth 70. Thereafter, the process is terminated. The general use is an example of a "second purpose". Note that a process of a subroutine in step S12 will be described below.

Figure 7:
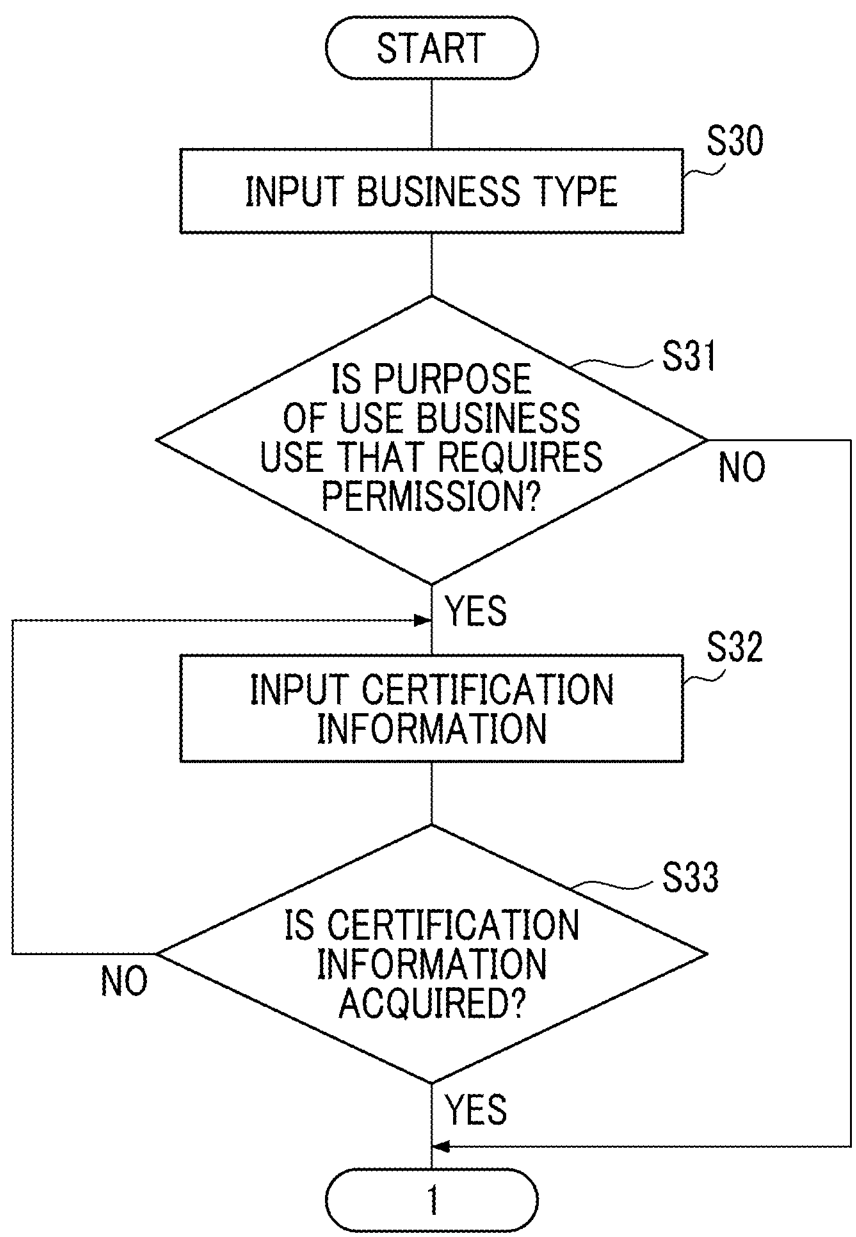
FIG. 7 is a flowchart showing a flow of a process of a subroutine in step S11 shown in FIG. 6.
Figure 8:
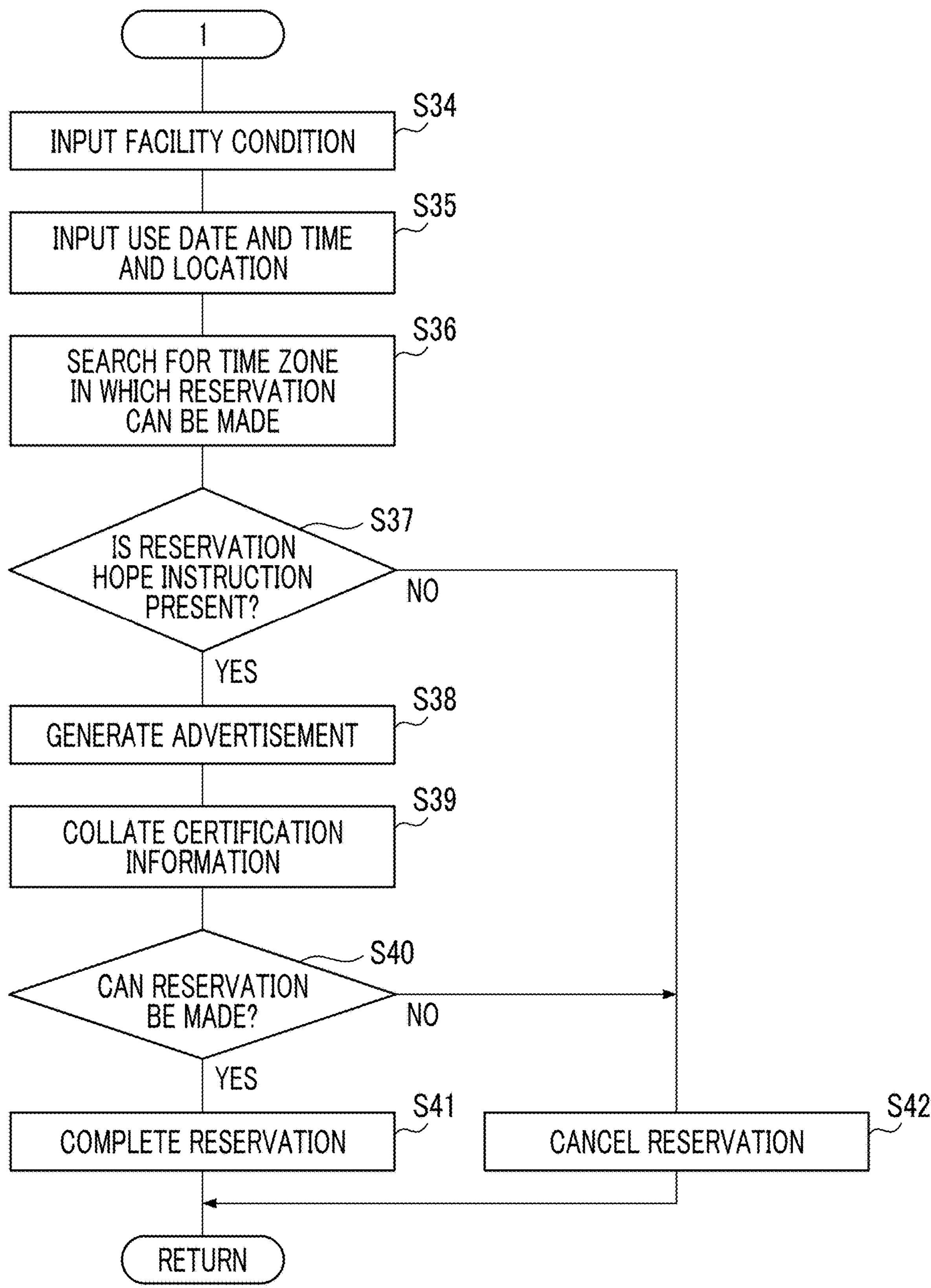
FIG. 8 is a flowchart showing a flow of the process of the subroutine in step S11 shown in FIG. 6.

FIGS. 7 and 8 are flowcharts showing a flow of the process of the subroutine in step S11 shown in FIG. 6.

In step S30 shown in FIG. 7, the CPU 12A accepts input of a business type of the product or the like desired to be provided in the work booth 70. Thereafter, the process proceeds to step S31. Note that a specific example of the "business type" will be described below.

In step S31, the CPU 12A determines whether or not predetermined permission is required for providing the product or the like corresponding to the business type for which the input is accepted in step S30, and in a case in which the determination is made that the permission is required (step S31: YES), the process proceeds to step S32. On the other hand, in a case in which the CPU 12A determines that the permission is not required (step S31:

NO), the process proceeds to step S34. As an example, the "predetermined permission" described above corresponds to "business permission of health center" in a case in which the product or the like corresponding to the business type is the food sale, and corresponds to "registration of lawyer qualification" in a case in which the product or the like corresponding to the business type is the legal advice. Here, in the storage 12D, the product or the like corresponding to the business type that requires the "predetermined permission" described above are stored in advance. In step S31, the CPU 12A searches for whether or not the "predetermined permission" is required to provide the product or the like corresponding to the accepted business type from the storage 12D, and determines whether or not the "predetermined permission" is required in accordance with a search result.

In step S32, the CPU 12A accepts the input of certification information which is information for certifying that the permission for providing the product or the like corresponding to the business type for which the input is accepted is accepted. Thereafter, the process proceeds to step S33. As an example, the "certification information" described above corresponds to "business permission" in a case in which the product or the like corresponding to the business type is the food sale, and corresponds to "registration of qualification" in a case in which the product or the like corresponding to the business type is the legal advice.

In step S33, the CPU 12A determines whether or not the certification information is acquired, and in a case in which the determination is made that the certification information is acquired (step S33: YES), the process proceeds to step S34. On the other hand, in a case in which the CPU 12A determines that the certification information is not acquired (step S33: NO), the process returns to step S32.

In step S34 shown in FIG. 8, the CPU 12A accepts input of a facility condition related to the work booth 70 in which a size of the work booth 70 and the device provided in the work booth 70 can be designated. Thereafter, the process proceeds to step S35. In the input of the facility condition, as an example, the size of the work booth 70 can be designated to be "xxx square meters or more" and a "kitchen" can be designated to be provided in the work booth 70 (see FIG. 10).

In step S35, the CPU 12A accepts input of use date and time and a location of the work booth 70. Thereafter, the process proceeds to step S36.

In step S36, the CPU 12A searches for a time zone in which the reservation can be made based on the condition for which the input is accepted. Thereafter, the process proceeds to step S37.

In step S37, the CPU 12A determines whether or not a reservation hope instruction indicating a reservation hope from the user is accepted with respect to the search result in step S36, and in a case in which the determination is made that the reservation hope instruction is accepted (step S37: YES), the process proceeds to step S38. On the other hand, in a case in which the CPU 12A determines that the reservation hope instruction is not accepted (step S37: NO), the process proceeds to step S42. The "reservation hope instruction" described above is an operation of the user on the reservation site indicating an intention to reserve a desired time zone in a case in which there is the desired time zone among a plurality of candidates presented as the search result.

In step S38, the CPU 12A generates an advertisement related to the product or the like provided in the work booth 70. Thereafter, the process proceeds to step S39. Note that a specific example of the "advertisement" will be described below.

In step S39, the CPU 12A collates the certification information acquired in step S33 shown in FIG. 7. Thereafter, the process proceeds to step S40. Here, in the storage 12D, collation information corresponding to the product or the like that requires the predetermined permission for collation with the certification information described above is stored in advance. In the storage 12D, as an example, as the "collation information" described above, "sample data of business permission" corresponding to a case in which the product or the like corresponding to the business type is the food sale, "sample data of registration of qualification" corresponding to a case in which the product or the like corresponding to the business type is the legal advice, and the like are stored. In step S39, the CPU 12A extracts the collation information corresponding to the accepted product or the like from the storage 12D, and calculates a degree of matching between the certification information and the collation information.

In step S40, the CPU 12A determines whether or not the work booth 70 can be reserved, and in a case in which the determination is made that the reservation can be made (step S40: YES), the process proceeds to step S41. On the other hand, in a case in which the CPU 12A determines that the reservation cannot be made (step S40: NO), the process proceeds to step S42. As an example, the CPU 12A determines that the reservation can be made in a case in which the degree of matching between the certification information and the collation information calculated in step S39 is equal to or larger than a predetermined standard, and determines that the reservation cannot be made in a case in which the degree of matching is less than the predetermined standard.

In step S41, the CPU 12A completes the reservation for the work booth 70. Thereafter, the process is terminated.

In step S42, the CPU 12A cancels the reservation for the work booth 70. Thereafter, the process is terminated.

Hereinafter, a display example of the reservation process in a case in which the purpose of use of the work booth 70 is the business use will be described. Note that in the following description, as an example, a case will be described in which the user reserves the work booth 70 by using the portable terminal device 14. The CPU 12A displays, on the portable terminal device 14, the display example of the reservation process described below by the corresponding steps of the flowcharts shown in FIGS. 6, 7, and 8 described above.

Figure 9:
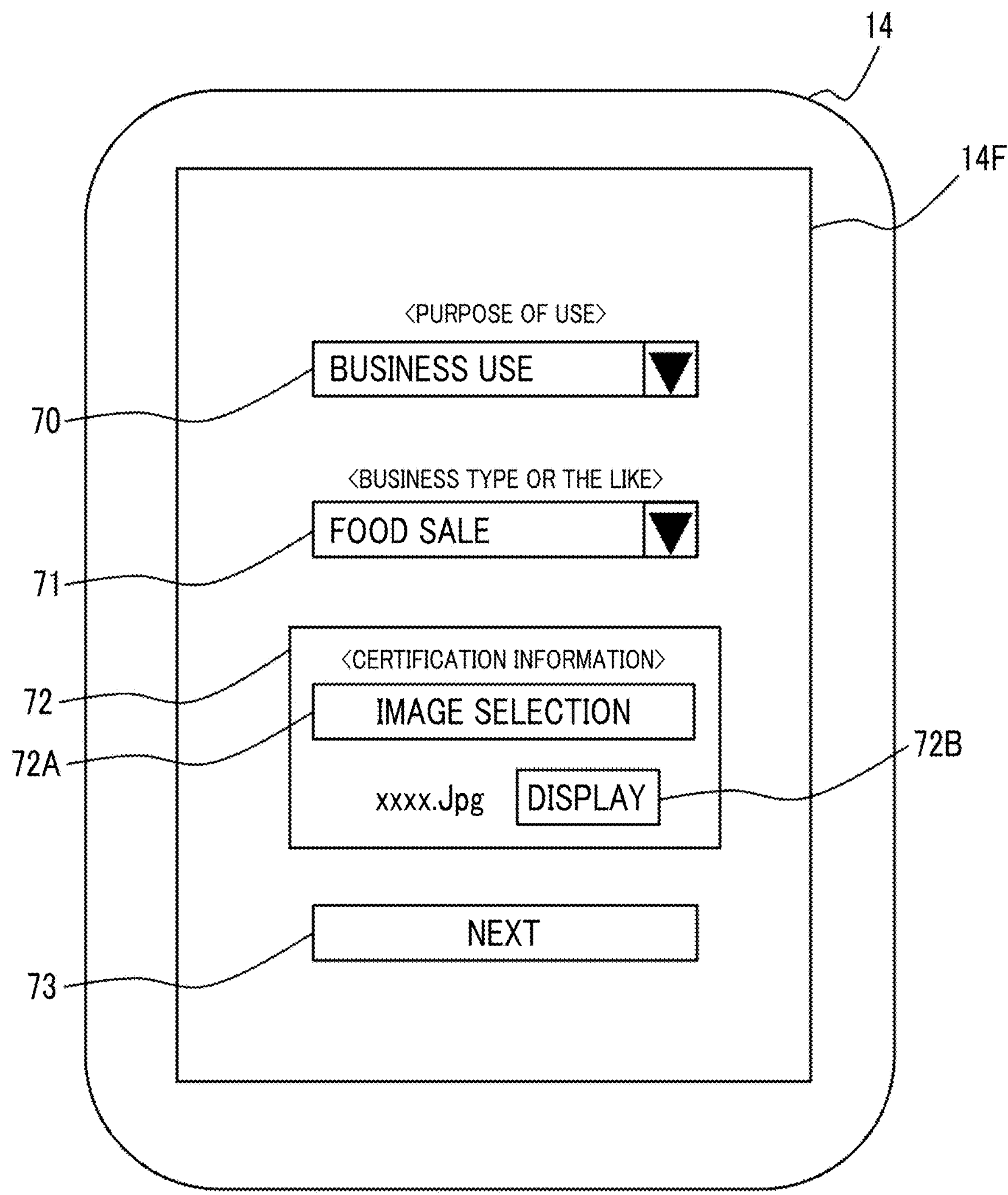
FIG. 9 is a first display example of the reservation process displayed on the portable terminal device.

FIG. 9 is a first display example of the reservation process. In a case in which an instruction to start the reservation process is accepted after the user logs in to the reservation site, the CPU 12A of the cloud server 12 displays the display example shown in FIG. 9 on a display 14F of the portable terminal device 14.

A purpose-of-use input portion 70, a business type input portion 71, a certification information input portion 72, and a next button 73 are displayed on the display 14F shown in FIG. 9.

The purpose-of-use input portion 70 is a portion to which the purpose of use is input. In a case in which the purpose-of-use input portion 70 is operated, as an example, a pull-down menu displaying "business use", "personal use", and "customer use" is displayed. Then, in the purpose-of-use input portion 70, one purpose of use selected from the pull-down menu is designated as the purpose of use in the reservation process. In FIG. 9, the "business use" is designated as the purpose of use. Note that a format for inputting the purpose of use is not limited to a selection format such as the pull-down menu, but may be any format such as an entry format and the like that the user can freely input the text or the like, as long as the purpose of use of the user can be input.

The business type input portion 71 is a portion to which the business type and the product or the like corresponding to the business type (hereinafter referred to as the "business type or the like") is input. In a case in which the business type input portion 71 is operated, as an example, a pull-down menu displaying "food sale", "massage", "fortune telling", "legal advice", and "English conversation class" is displayed. Then, in the business type input portion 71, one business type or the like selected from the pull-down menu is designated as the business type or the like in the reservation process. In FIG. 9, the "food sale" is designated as the business type or the like. Note that in FIG. 9, the display contents of the business type input portion 71 such as the "food sale" and the like is displayed by integrating the business type and the product or the like corresponding to the business type, but the display contents of the business type input portion 71 are not limited to this. As an example, a configuration may be adopted in which in a case in which the business type input portion 71 is operated, the pull-down menu displaying the business type such as "retail" and "service job" is displayed, any business type is selected in the pull-down menu, and then the pull-down menu displaying the product or the like corresponding to the business type such as "food" and "furniture" is displayed.

The certification information input portion 72 is a portion to which the certification information is input. In a case in which an image selection button 72A of the certification information input portion 72 is operated, a selection screen (not shown) of an image is displayed. Then, in the certification information input portion 72, the image selected on the selection screen is designated as the certification information in the reservation process. Note that in the certification information input portion 72, in a case in which a display button 72B is operated, the image designated as the certification information is displayed.

Figure 10:
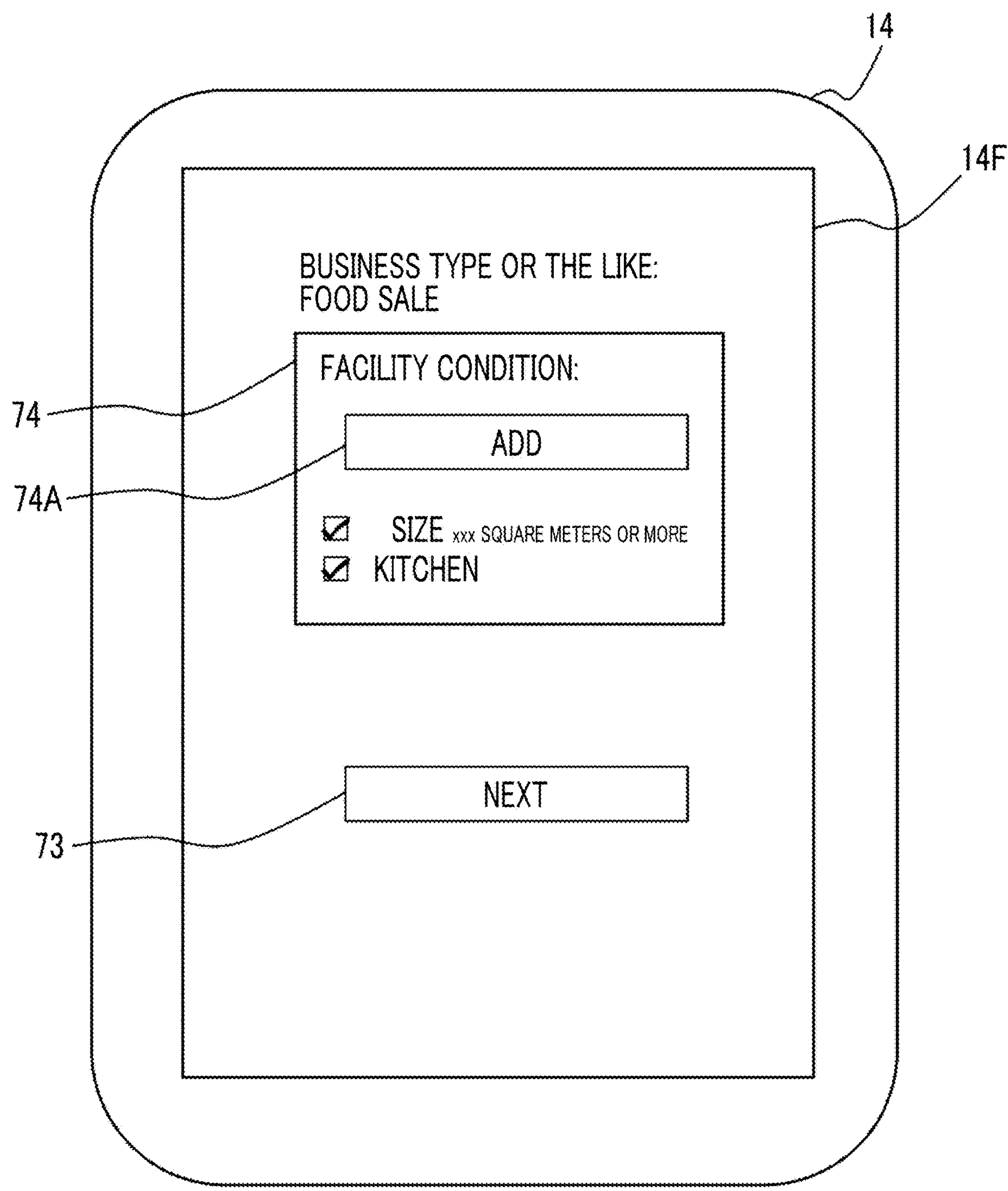
FIG. 10 is a second display example of the reservation process displayed on the portable terminal device.

In a case in which the next button 73 is operated after the information is input to the purpose-of-use input portion 70, the business type input portion 71, and the certification information input portion 72, the CPU 12A switches the display contents of the display 14F to a display example shown in FIG. 10.

FIG. 10 is a second display example of the reservation process.

On the display 14F shown in FIG. 10, a facility condition input portion 74 and the next button 73 are displayed.

The facility condition input portion 74 is a portion to which the facility condition is input. In a case in which an add button 74A of the facility condition input portion 74 is operated, an addition screen (not shown) of the facility condition is displayed. Then, in the facility condition input portion 74, one or more items selected on the addition screen are designated as the facility condition in the reservation process. In FIG. 10, as the facility condition, the size of the work booth 70 is designated to be "xxx square meters or more" and a "kitchen" is designated to be provided in the work booth 70.

Figure 11:
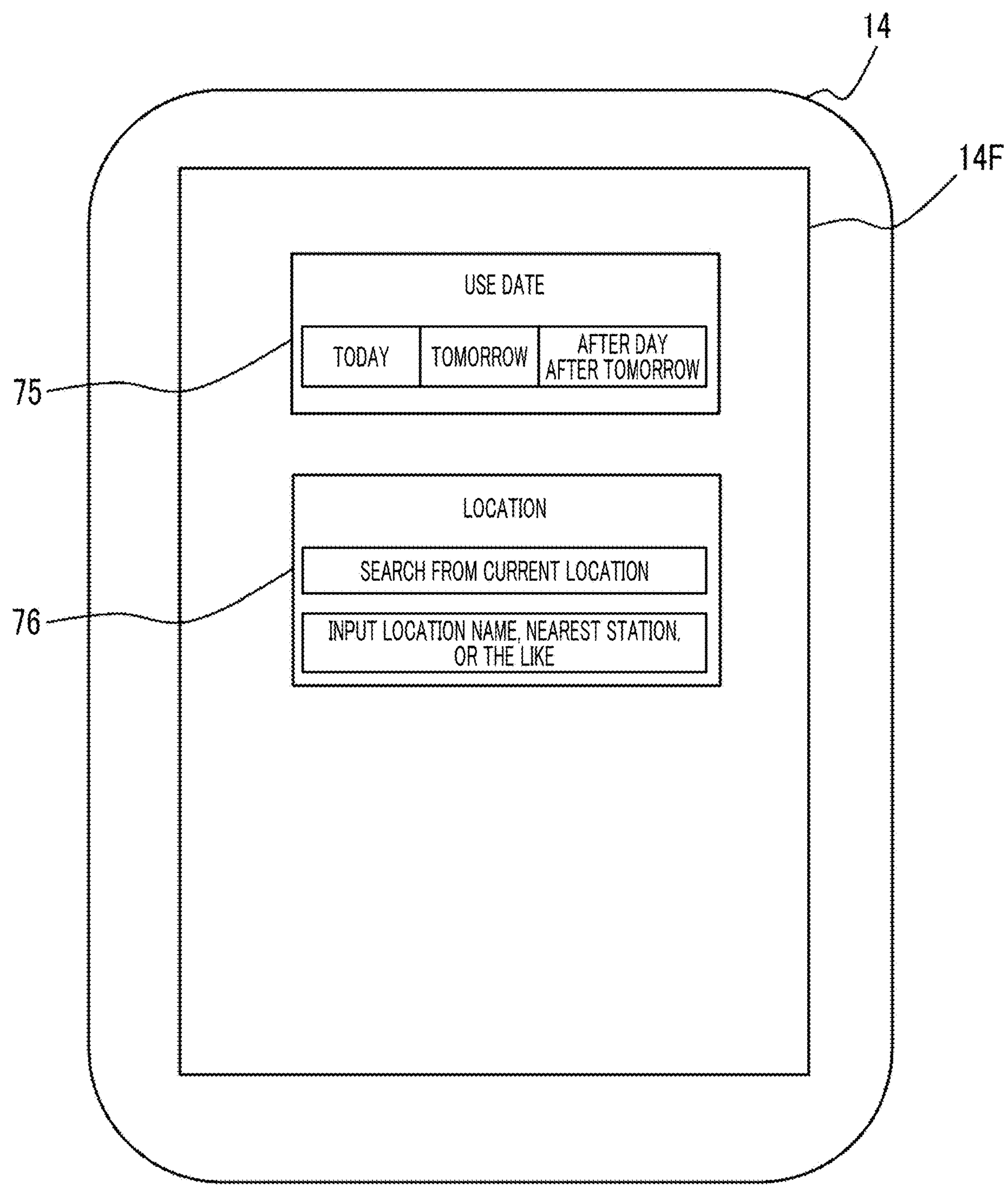
FIG. 11 is a third display example of the reservation process displayed on the portable terminal device.

In a case in which the next button 73 is operated after the facility condition is input to the facility condition input portion 74, the CPU 12A switches the display contents of the display 14F to a display example shown in FIG. 11.

FIG. 11 is a third display example of the reservation process.

On the display 14F shown in FIG. 11, a use date input portion 75 and a location input portion 76 are displayed.

The use date input portion 75 is a portion to which the use date that the user hopes to use the work booth 70 is input. In FIG. 11, as an example, three items of "today", "tomorrow", and "after the day after tomorrow" are displayed in the use date input portion 75. In a case in which any of "today" or "tomorrow" is selected, the day when the reservation process is performed or the next day of the day is input as the use date. In a case in which "after the day after tomorrow" is selected, a calendar is displayed as an example, the user selects a schedule after the day after tomorrow on the day when the reservation process is performed, and the selected schedule is input as the use date.

The location input portion 76 is a portion to which the location of the work booth 70 that the user hopes to use is input. In FIG. 11, as an example, two items of "search from the current location" and "input a location name, the nearest station, and the like" are displayed in the location input portion 76. In a case in which "search from the current location" is selected, the work booth 70 that is positioned within a predetermined distance (for example, within 1 km) from the current location of the portable terminal device 14 and satisfies the facility condition input to the facility condition input portion 74 shown in FIG. 10 is displayed as candidate information 77 (see FIG. 12) described below. In a case in which "input a location name, the nearest station, and the like" is selected, the user inputs a search keyword such as the location name, the nearest station, or the like, and the work booth 70 that is positioned within a predetermined distance (for example, within 1 km) from the location decided by the input search keyword and satisfies the facility condition input to the facility condition input portion 74 shown in FIG. 10 is displayed as the candidate information 77 (see FIG. 12).

Figure 12:
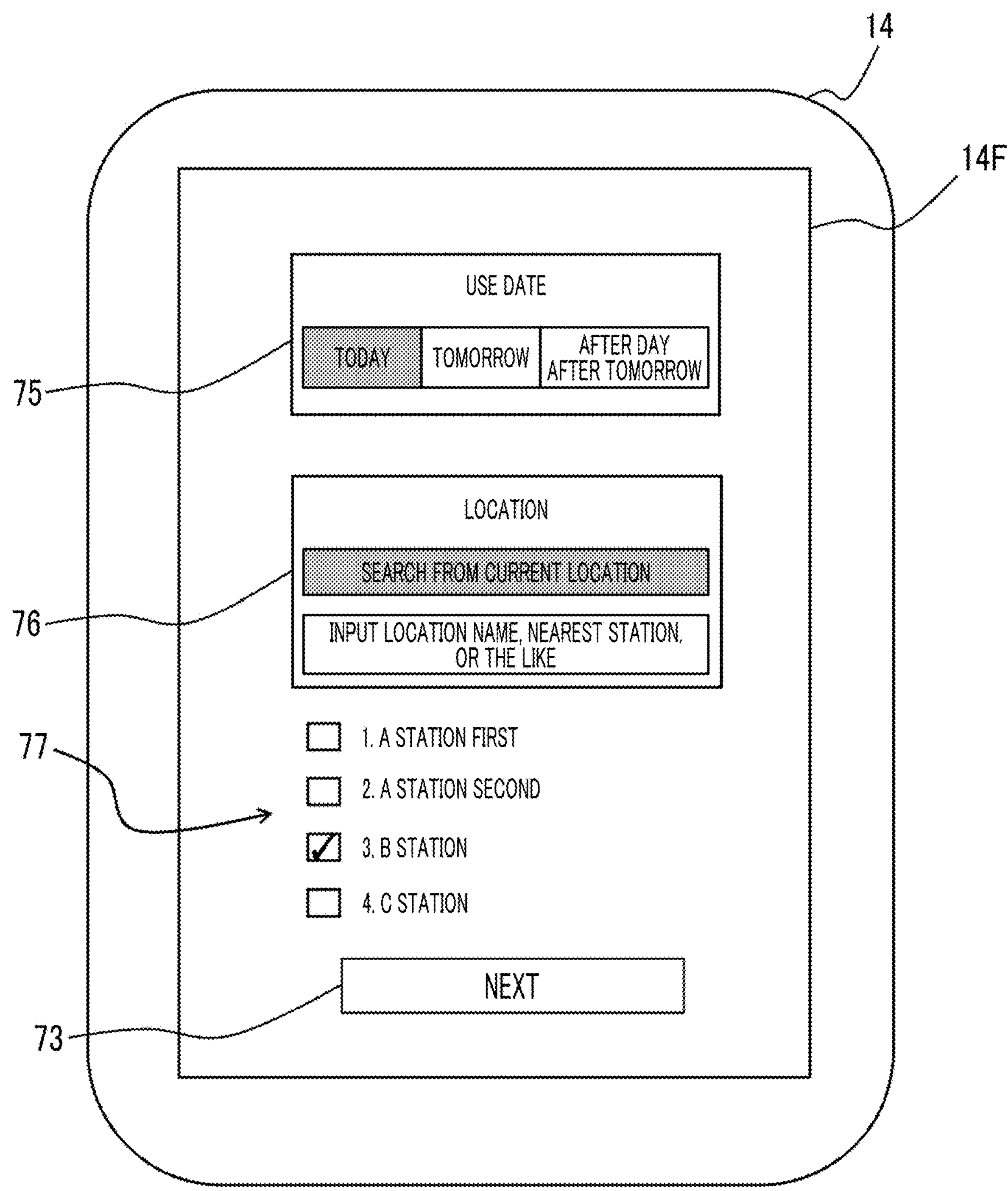
FIG. 12 is a fourth display example of the reservation process displayed on the portable terminal device.

FIG. 12 is a fourth display example of the reservation process. In a case in which the information is input to each of the use date input portion 75 and the location input portion 76, the CPU 12A switches the display contents of the display 14F from the display example shown in FIG. 11 to the display example shown in FIG. 12. Note that, as an example, FIG. 12 shows a state in which "today" is selected in the use date input portion 75 and "search from the current location" is selected in the location input portion 76.

In the display example shown in FIG. 12, in addition to the display example shown in FIG. 11, the candidate information and the next button 73 are displayed. The candidate information 77 includes a plurality of candidates and a check box by which a specific candidate can be selected from the plurality of candidates. As an example, in FIG. 12, as the candidate information 77, a plurality of candidates for the work booth 70 corresponding to the information input to each of the use date input portion 75 and the location input portion 76 are displayed. Then, in FIG. 12, as an example, a state is shown in which a check mark is added to the check box of "3. B station" among the plurality of candidates for the work booth 70.

Figure 13:
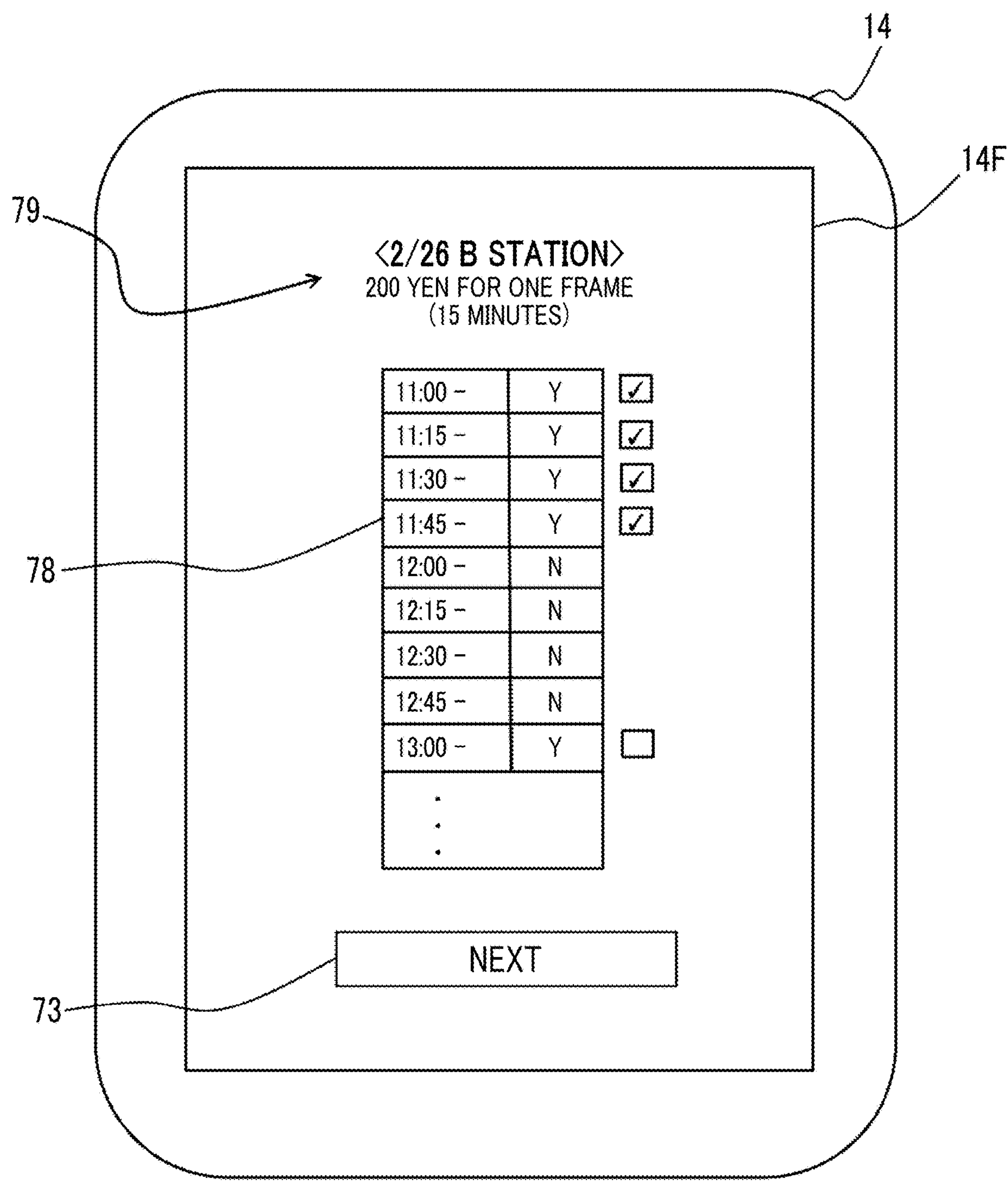
FIG. 13 is a fifth display example of the reservation process displayed on the portable terminal device.

In a case in which the next button 73 is operated after the check mark is added to one or more check boxes among the plurality of candidates for the work booth 70 displayed as the candidate information 77, the CPU 12A switches the display contents of the display 14F to a display example shown in FIG. 13.

FIG. 13 is a fifth display example of the reservation process.

Time zone information 78, message information 79, and the next button 73 are displayed on the display 14F shown in FIG. 13.

The time zone information 78 includes a time zone in which the work booth 70 selected as the specific candidate described above can be used and a time zone in which the work booth 70 can be reserved. As an example, in FIG. 13, as the time zone information 78, the time zone in which the work booth 70 can be used is divided and displayed with one frame of "15 minutes", and a reservation status for each divided frame is displayed as "Y" or "N". Note that as the reservation status, "Y" indicates that the reservation can be made, and "N" indicates that the reservation cannot be made.

Further, in FIG. 13, the check box is displayed on the right side of the time zone for which the reservation can be made, and the check mark can be added to one or more check boxes. Further, meaning of "the reservation cannot be made" described above includes that the time in which the reservation can be made has already passed and that the reservation has already been made. As described above, in the present exemplary embodiment, the time zone in which the work booth 70 can be reserved is indicated by displaying "Y" or "N" as the reservation status. In addition, the time zone information 78 may be displayed as "N" before and after the continuous reservation.

The message information 79 indicates various messages with respect to the user. As an example, in FIG. 13, as the message information 79, "<2/26 B station> 200 yen per frame (15 minutes)" is displayed.

Figure 14:
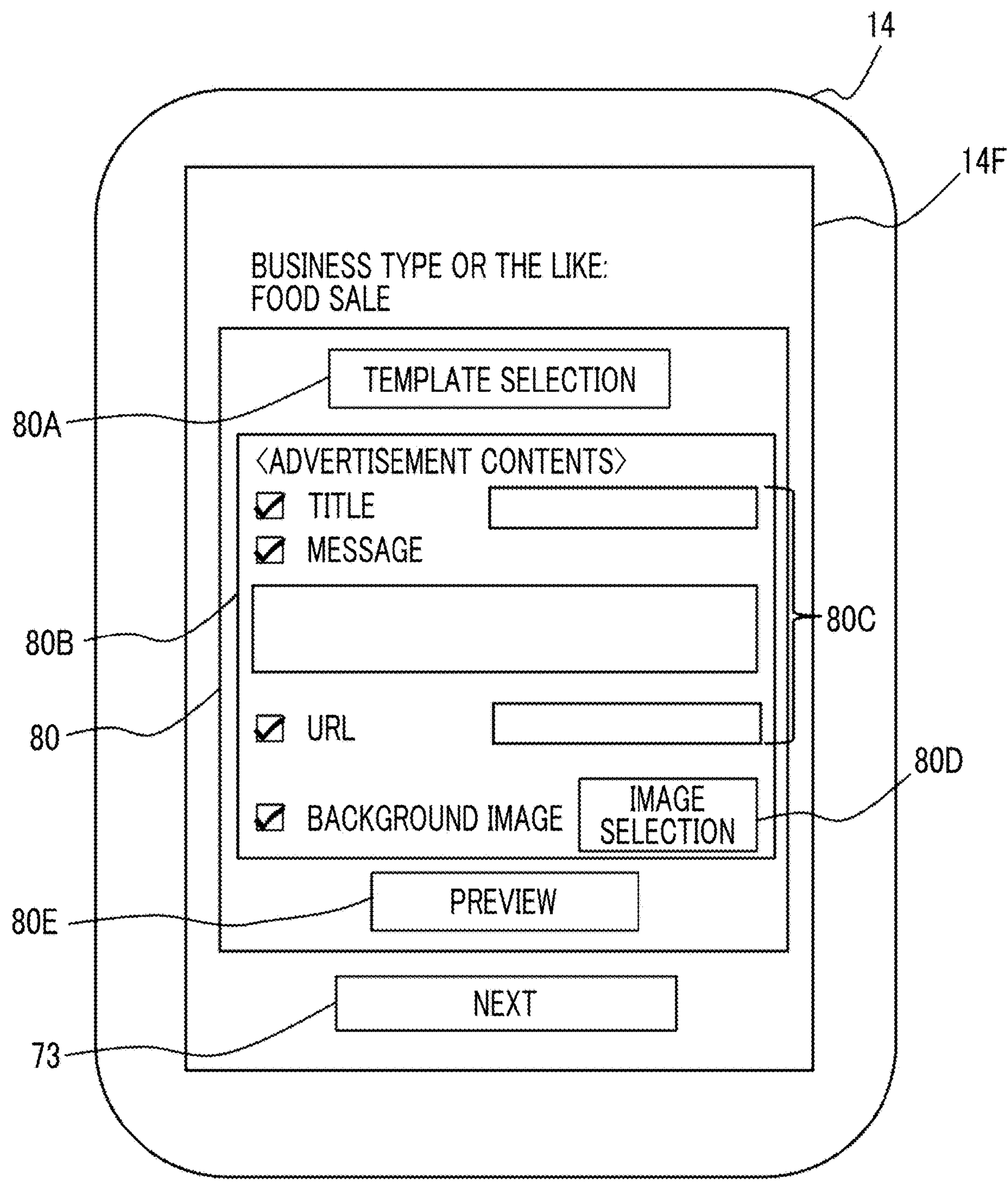
FIG. 14 is a sixth display example of the reservation process displayed on the portable terminal device.

In a case in which the next button 73 is operated after the check mark is added to one or more check boxes among the candidates for the time zone in which the reservation can be made displayed as the time zone information 78, the CPU 12A switches the display contents of the display 14F to a display example shown in FIG. 14. In this case, the CPU 12A accepts a designation of the time zones of four frame of "11:00-", "11:15-", "11:30-", and "11:45-" among the time zones displayed to be "Y" in the time zone information 78.

Note that FIG. 13 is the display example in which only one work booth 70 is present in the vicinity of the B station, and thus the reservation status displayed by "Y" or "N" is displayed in only one column. However, in a case in which three work booths 70 are present in the vicinity of the B station, the reservation status displayed by "Y" or "N" is displayed in three columns in accordance with the three work booths 70.

FIG. 14 is a sixth display example of the reservation process.

An advertisement information input portion 80 and the next button 73 are displayed on the display 14F shown in FIG. 14.

The advertisement information input portion 80 is a portion to which advertisement information for performing an advertisement related to the product or the like provided in the work booth 70 is input. In the advertisement information input portion 80, a template selection button 80A, an advertisement content input portion 80B, and a preview button 80E are provided.

The template selection button 80A is a portion for selecting a layout template of the advertisement information prepared in advance. Ina case in which the template selection button 80A is operated, a selection screen (not shown) of the layout template is displayed. Then, in the advertisement information input portion 80, a layout corresponding to the layout template selected on the selection screen is designated as an advertisement layout in the advertisement information.

The advertisement content input portion 80B is a portion to which advertisement contents are input. As an example, the advertisement contents that can be input by the advertisement content input portion 80B include a "title", a "message", a "uniform resource locator (URL)", and a "background image".

Among the advertisement contents described above, the "title", the "message", and the "URL" are provided with an input field 80C corresponding to each advertisement content. Then, in the advertisement information input portion 80, the information input in the input field 80C is designated as each advertisement content in the advertisement information.

Further, among the advertisement contents described above, the "background image" is designated by the operation of an image selection button 80D. Specifically, in a case in which the image selection button 80D of the advertisement content input portion 80B is operated, a selection screen (not shown) of an image is displayed. Then, in the advertisement information input portion 80, the image selected on the selection screen is designated as the background image in the advertisement information.

The preview button 80E is a portion for displaying a preview of the advertisement information generated by using the advertisement information input portion 80. In the advertisement information input portion 80, in a case in which the preview button 80E is operated, a preview screen 81 (see FIG. 15) of the generated advertisement information is displayed.

Figure 16:
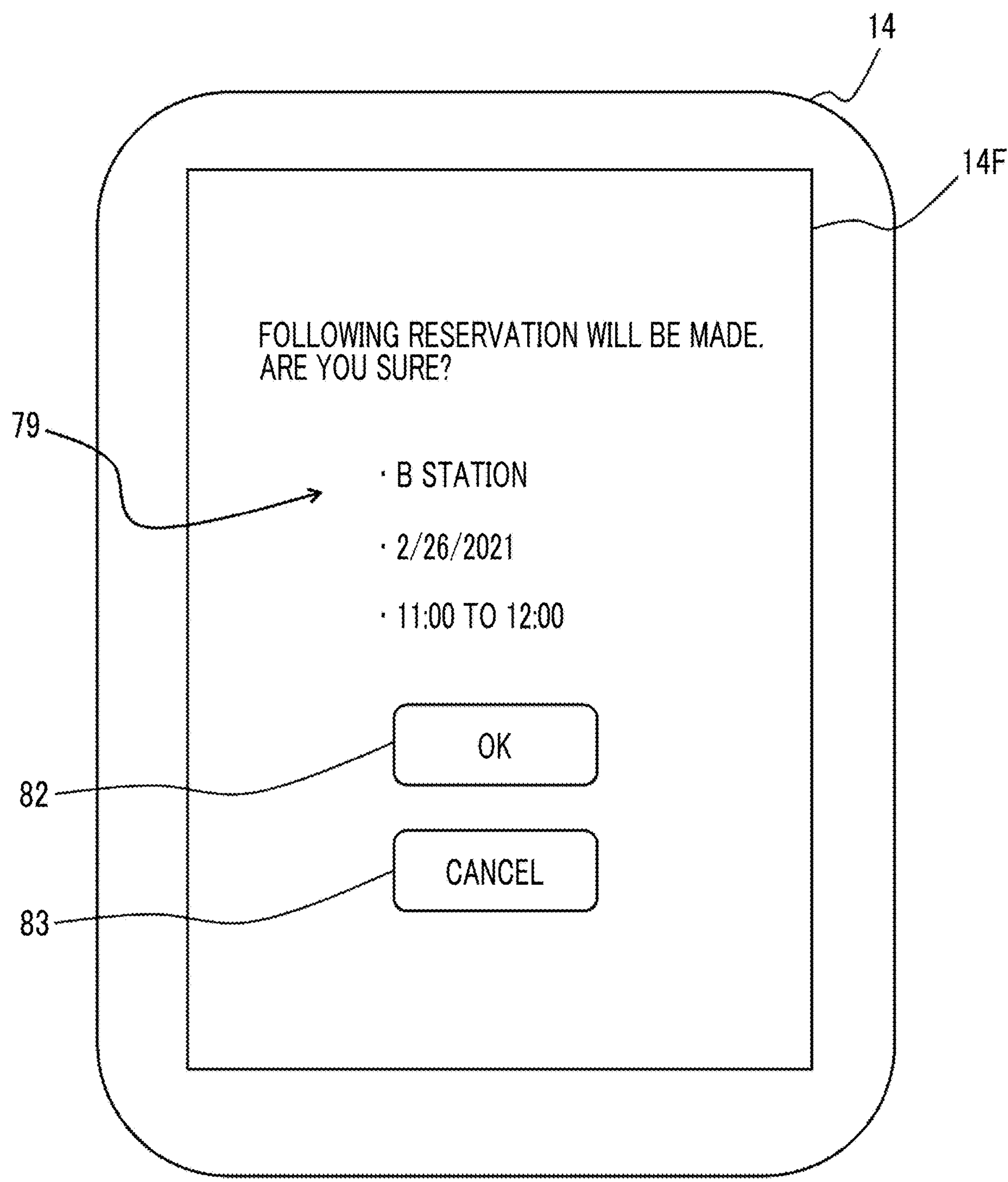
FIG. 16 is an eighth display example of the reservation process displayed on the portable terminal device.

In a case in which the next button 73 is operated after the advertisement information is generated by using the advertisement information input portion 80, the CPU 12A switches the display contents of the display 14F to a display example shown in FIG. 16.

Figure 15:
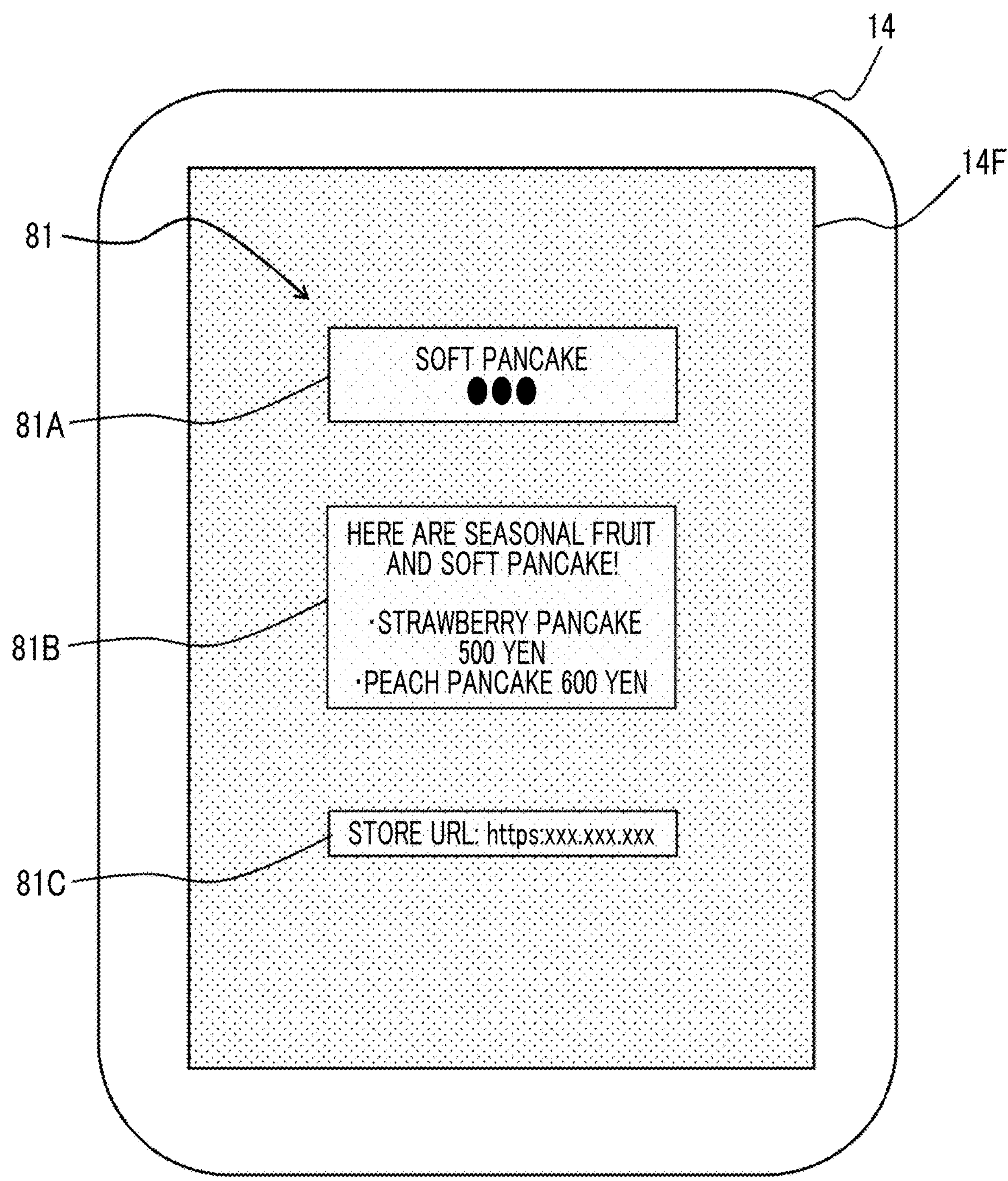
FIG. 15 is a seventh display example of the reservation process displayed on the portable terminal device.

FIG. 15 is a seventh display example of the reservation process.

The preview screen 81 is displayed on the display 14F shown in FIG. 15. The display example shown in FIG. 15 shows a state in which the preview button 80E is operated while the display example shown in FIG. 14 is displayed on the display 14F.

The preview of the advertisement information generated by using the advertisement information input portion 80 is displayed on the preview screen 81. On the preview screen 81, a title display portion 81A, a message display portion 81B, and a URL display portion 81C corresponding to the "title", the "message", and the "URL" input by using the advertisement content input portion 80B, respectively, are provided. The title display portion 81A, the message display portion 81B, and the URL display portion 81C display each advertisement content input by using the advertisement content input portion 80B.

Here, the advertisement layouts of the title display portion 81A, the message display portion 81B, and the URL display portion 81C on the preview screen 81 shown in FIG. 15 are layouts corresponding to the layout template selected by using the template selection button 80A. The background image with dots on the preview screen 81 shown in FIG. 15 is an image designated by the operation of the image selection button 80D of the advertisement content input portion 80B.

FIG. 16 is an eighth display example of the reservation process.

The message information 79, an OK button 82, and a cancel button 83 are displayed on the display 14F shown in FIG. 16. As an example, in FIG. 16, as the message information 79, "following reservation will be made. Are you sure? ■B station ■2021/2/26 ■11:00-12:00" is displayed. In the present exemplary embodiment, in a case in which the user operates the OK button 82 during the display of the display example shown in FIG. 16, the CPU 12A completes the reservation for the work booth 70 with the content of the message information 79 shown in FIG. 16. On the other hand, in the present exemplary embodiment, in a case in which the user operates the cancel button 83 during the display of the display example shown in FIG. 16, the CPU 12A cancels the reservation for the work booth 70 and changes the display 14F with predetermined display contents.

In a case in which the reservation process is completed and the reservation for the work booth 70 is made, the CPU 12A stores the reservation information about the reservation in a database 121. The reservation information includes, as an example, the time zone and location in which the reservation is completed, a name of a person who made the reservation, the purpose of use of the work booth 70, and the like. As a result, in the database 121, the information on when and where the work booth is used by which user is stored as the reservation information for each work booth 70.

Next, a case will be described in which in the reservation process shown in FIG. 6, the process proceeds to NO in step S10, and the reservation process is executed in a case in which the purpose of use of the work booth 70 is the general use in step S12.

Figure 17:
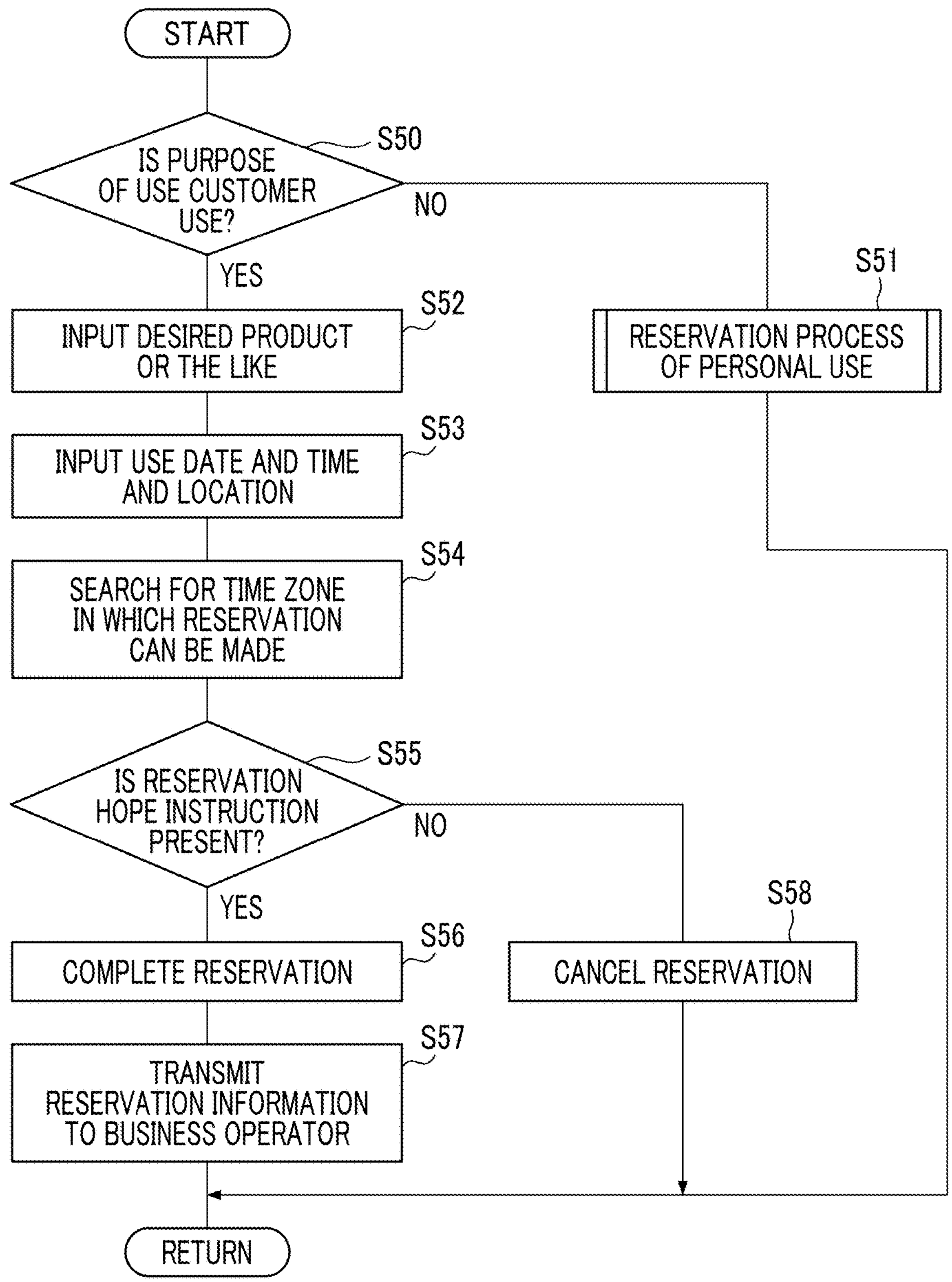
FIG. 17 is a flowchart showing a flow of a process of a subroutine in step S12 shown in FIG. 6.

FIG. 17 is a flowchart showing a flow of the process of the subroutine in step S12 shown in FIG. 6.

In step S50 shown in FIG. 17, the CPU 12A determines whether or not the purpose of use of the work booth 70 for which the input is accepted is the customer use for using the work booth 70 as the customer of the user (hereinafter, referred to as a "business operator") who provides the product or the like in the work booth 70, in a case in which the determination is made that the purpose of use is the customer use (step S50: YES), the process proceeds to step S52. On the other hand, in a case in which the CPU 12A determines that the purpose of use is not the customer use (step S50: NO), the process proceeds to step S51.

In step S51, the CPU 12A executes the reservation process in a case in which the purpose of use of the work booth 70 is the personal use different from the customer use in the general use. Thereafter, the process is terminated. Note that a process of a subroutine in step S51 will be described below.

In step S52, the CPU 12A accepts the input of the product or the like desired to be provided in the work booth 70. Thereafter, the process proceeds to step S53. Note that a specific example of the "product or the like" will be described below.

In step S53, the CPU 12A accepts input of use date and time and a location of the work booth 70. Thereafter, the process proceeds to step S54.

In step S54, the CPU 12A searches for the time zone in which the reservation can be made based on the condition for which the input is accepted. Thereafter, the process proceeds to step S55.

In step S55, the CPU 12A determines whether or not the reservation hope instruction from the user is accepted with respect to the search result in step S54, and in a case in which the determination is made that the reservation hope instruction is accepted (step S55: YES), the process proceeds to step S56. On the other hand, in a case in which the CPU 12A determines that the reservation hope instruction is not accepted (step S55: NO), the process proceeds to step S58.

In step S56, the CPU 12A completes the reservation for the work booth 70. Thereafter, the process proceeds to step S57.

In step S57, the CPU 12A transmits the reservation information to the business operator. As an example, the CPU 12A transmits, to the business operator, the time zone (for example, 11:00-11:15) in which the reservation for the customer use is completed as the reservation information. Thereafter, the process is terminated.

In step S58, the CPU 12A cancels the reservation for the work booth 70. Thereafter, the process is terminated.

Hereinafter, a display example of the reservation process in a case in which the purpose of use of the work booth 70 is the customer use will be described while simplifying or omitting an overlapping portion with a case of the business use described above. The CPU 12A displays, on the portable terminal device 14, the display example of the reservation process described below by the corresponding steps of the flowcharts shown in FIGS. 6 and 17 described above.

Figure 18:
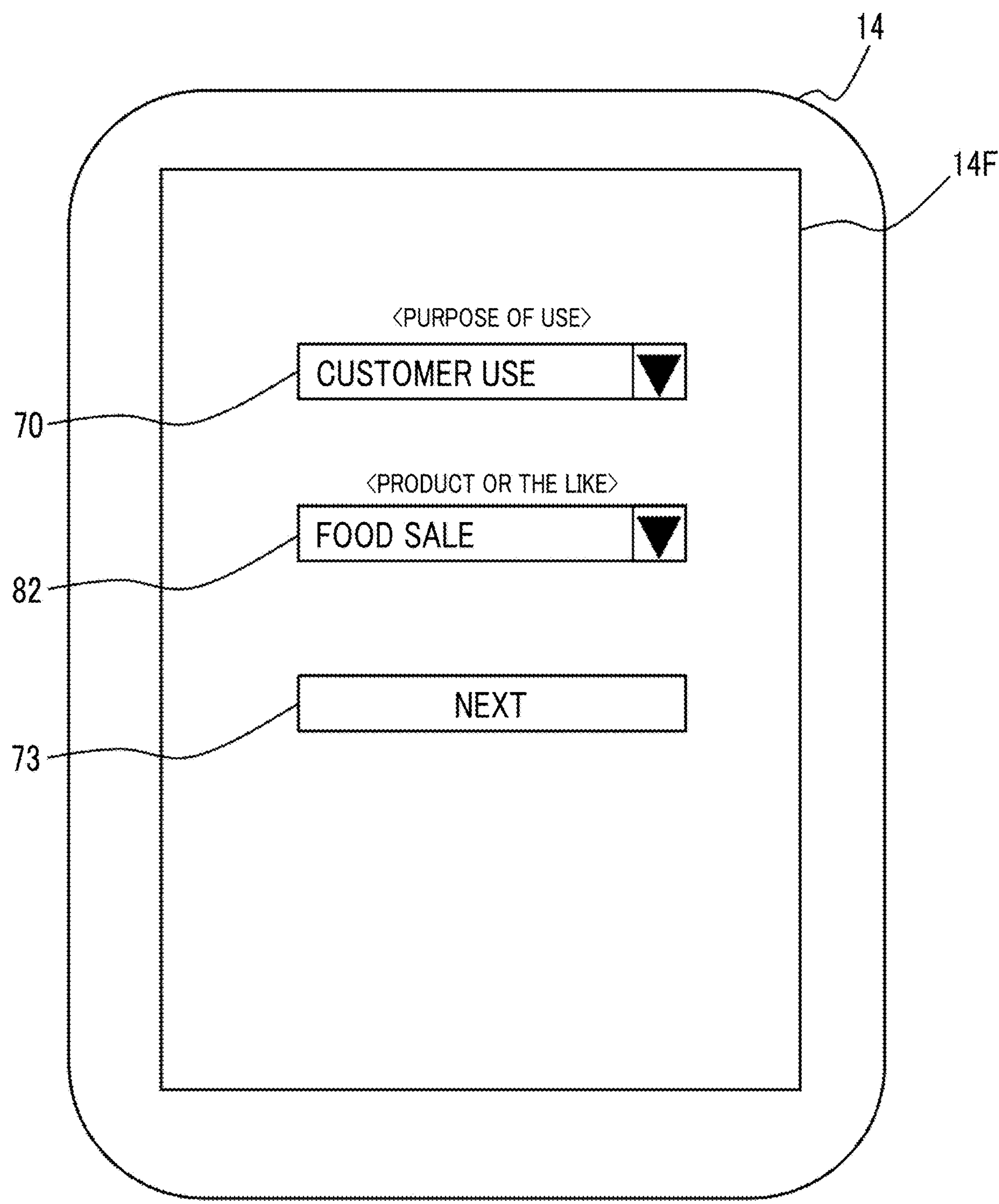
FIG. 18 is a ninth display example of the reservation process displayed on the portable terminal device.

FIG. 18 is a ninth display example of the reservation process.

The purpose-of-use input portion 70, a product-or-the like input portion 82, and the next button 73 are displayed on the display 14F shown in FIG. 18. In FIG. 18, the "customer use" is designated as the purpose of use.

The product-or-the like input portion 82 is a portion to which the product or the like desired to be provided in the work booth 70 is input. In a case in which the product-or-the like input portion 82 is operated, as an example, the pull-down menu displaying the "food sale", the "massage", the "fortune telling", the "legal advice", the "English conversation class", and the like, which is the identical contents as the business type input portion 71 (see FIG. 9), is displayed. Then, in the product-or-the like input portion 82, one product or the like selected from the pull-down menu is designated as the product or the like in the reservation process. In FIG. 18, the "food sale" is designated as the product or the like.

In a case in which the next button 73 is operated after the information is input to the purpose-of-use input portion 70 and the product-or-the like input portion 82, the CPU 12A switches the display contents of the display 14F to the display example shown in FIG. 11.

Next, a case will be described in which in the reservation process shown in FIG. 17, the process proceeds to NO in step S50, and the reservation process is executed in a case in which the purpose of use of the work booth 70 is the personal use in step S51.

Figure 19:
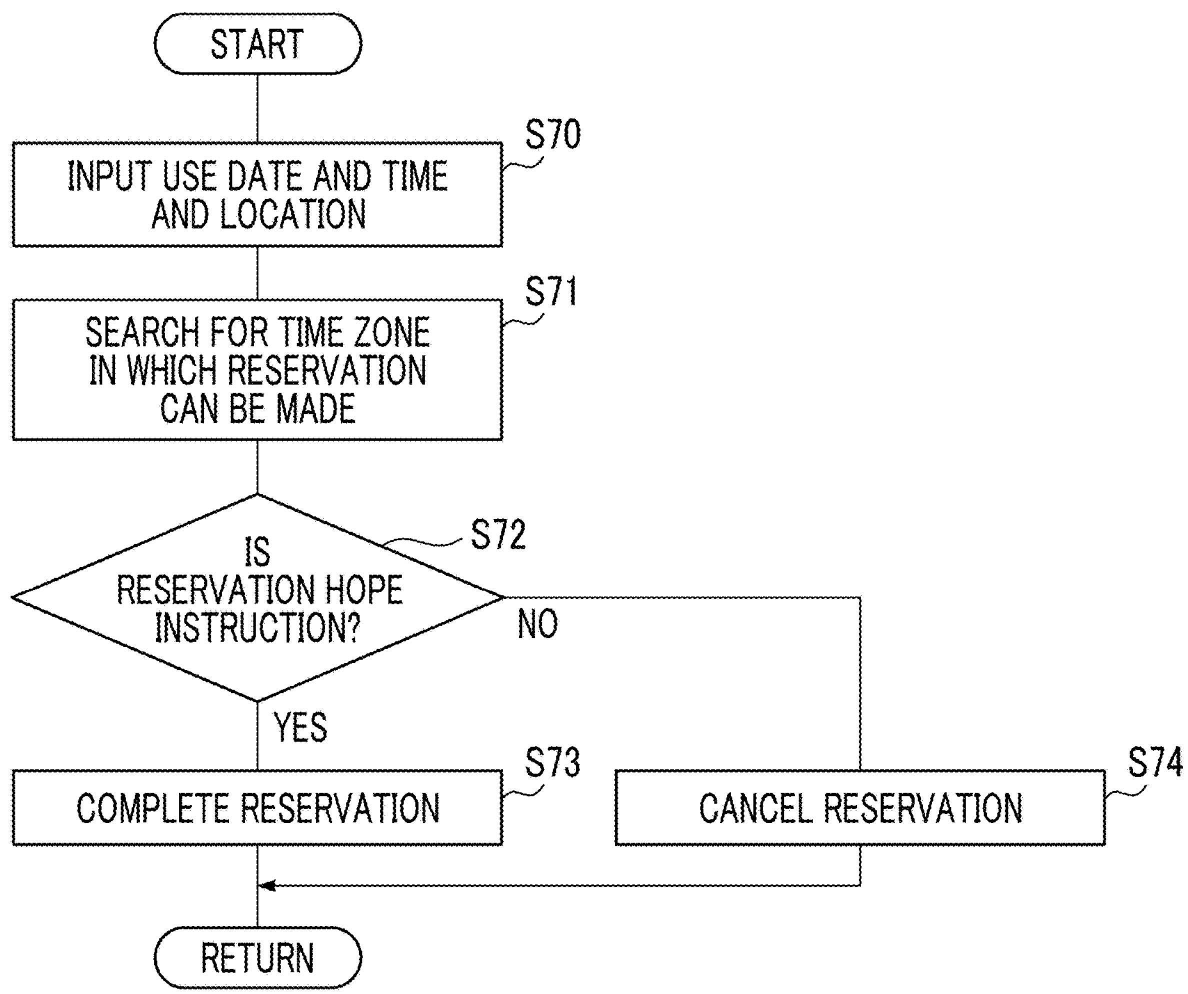
FIG. 19 is a flowchart showing a flow of a process of a subroutine in step S51 shown in FIG. 17.

FIG. 19 is a flowchart showing a flow of the process of the subroutine in step S51 shown in FIG. 17.

In step S70, the CPU 12A accepts input of use date and time and a location of the work booth 70. Thereafter, the process proceeds to step S71.

In step S71, the CPU 12A searches for the time zone in which the reservation can be made based on the condition for which the input is accepted. Thereafter, the process proceeds to step S72.

In step S72, the CPU 12A determines whether or not the reservation hope instruction from the user is accepted with respect to the search result in step S71, and in a case in which the determination is made that the reservation hope instruction is accepted (step S72: YES), the process proceeds to step S73. On the other hand, in a case in which the CPU 12A determines that the reservation hope instruction is not accepted (step S72: NO), the process proceeds to step S74.

In step S73, the CPU 12A completes the reservation for the work booth 70. Thereafter, the process is terminated.

In step S74, the CPU 12A cancels the reservation for the work booth 70. Thereafter, the process is terminated.

Hereinafter, a display example of the reservation process in a case in which the purpose of use of the work booth 70 is the personal use will be described while simplifying or omitting an overlapping portion with a case of the business use or the customer use described above. The CPU 12A displays, on the portable terminal device 14, the display example of the reservation process described below by the corresponding steps of the flowcharts shown in FIGS. 6 and 19 described above.

Figure 20:
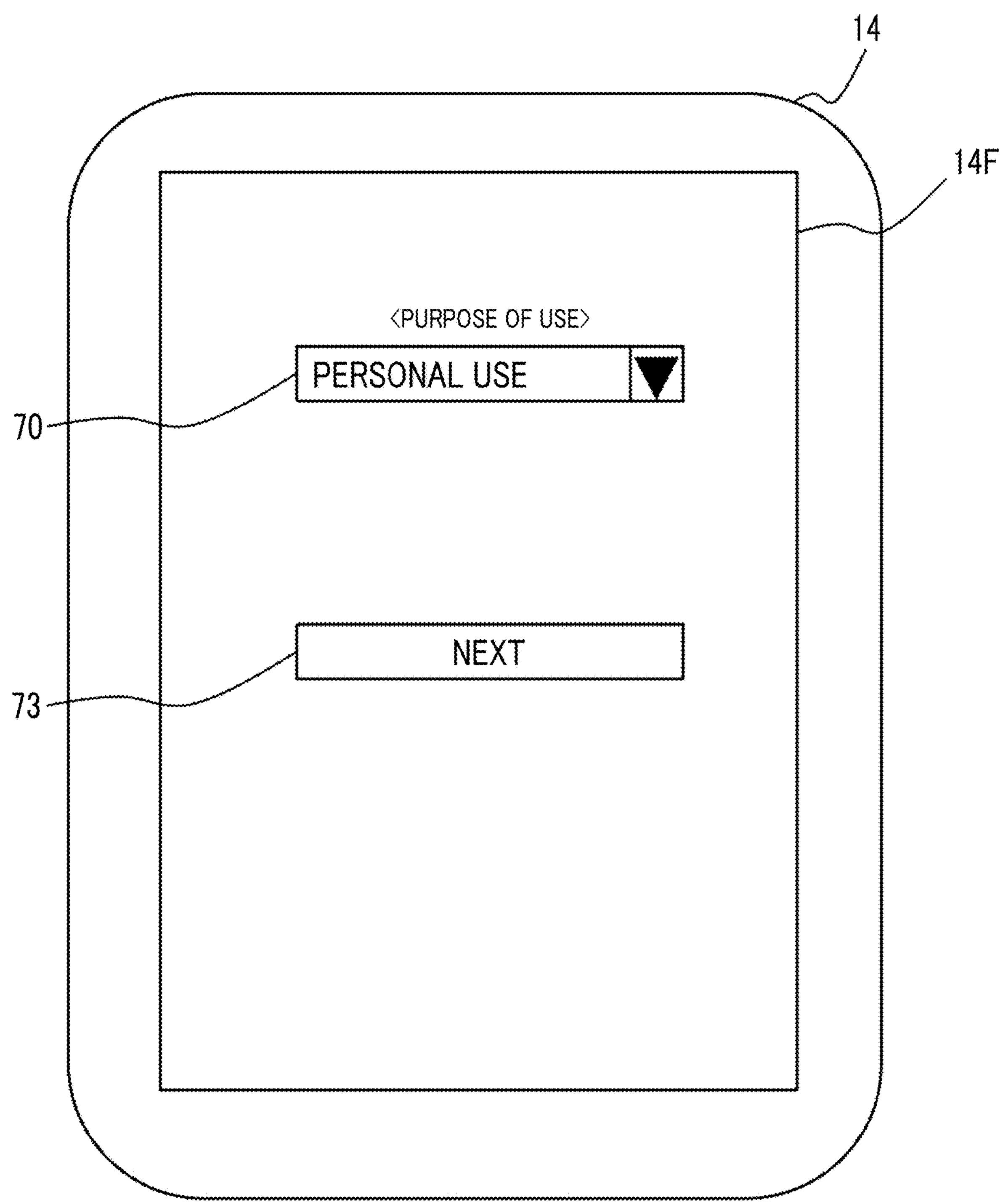
FIG. 20 is a tenth display example of the reservation process displayed on the portable terminal device.

FIG. 20 is a tenth display example of the reservation process.

The purpose-of-use input portion 70 and the next button 73 are displayed on the display 14F shown in FIG. 20. In FIG. 20, "personal use" is designated as the purpose of use.

In a case in which the next button 73 is operated after the information is input to the purpose-of-use input portion 70, the CPU 12A switches the display contents of the display 14F to the display example shown in FIG. 11.

As described above, in the present exemplary embodiment, the CPU 12A accepts the input of one purpose of use from among a plurality of the purposes of use provided for the work booth 70 in the reservation process, and changes, in accordance with the accepted purpose of use, at least one of the function provided in the reserved work booth 70 or the information for which the input is accepted in the reservation process.

In the present exemplary embodiment, as an example, the "function provided in the reserved work booth 70" described above is a function of the device provided in the reserved work booth 70. As a result, in the present exemplary embodiment, as an example, in accordance with the accepted purpose of use, as an example, an amount of light, the lighting pattern, the color, and the like of the lamp provided in the work booth 70 can be adjusted, or the door provided in the work booth 70 can be opened at all times. Further, as the "information for which the input is accepted in the reservation process" described above, as an example, the business type of the product or the like desired to be provided in the work booth 70, the facility condition, and the product or the like desired to be provided in the work booth 70. Then, in the present exemplary embodiment, whether or not to input the "information for which the input is accepted in the reservation process" listed above in the reservation process is changed in accordance with the accepted purpose of use.

With the configuration described above, according to the present exemplary embodiment, in a case in which the purpose of use of the work booth 70 is selected from among the plurality of purposes of use, the process in accordance with the purpose of use input at the time of the reservation for the work booth 70 is executed.

Further, in the present exemplary embodiment, in the reservation process, the CPU 12A accepts, as the purpose of use of the work booth 70, the input of the business use for providing the product or the like or the general use not for providing the product or the like. Therefore, according to the present exemplary embodiment, the input of the purpose of use of the work booth 70 is classified and accepted in accordance with whether or not the purpose of use is for providing the product or the like. As described above, in the present exemplary embodiment, by classifying the purpose of use of the work booth 70 into the business use and the general use, a use environment of the work booth 70 can be easily arranged as compared with the configuration in which the input of the purpose of use is not accepted in the reservation process. As an example, in the present exemplary embodiment, with the configuration described above, one frame after the reservation for the business use is completed can be used for the cleaning time of the work booth 70 without accepting the reservation.

Further, as the general use described above, the customer use for using the work booth 70 as the customer of the business operator and the personal use different from the customer use are provided. Therefore, according to the present exemplary embodiment, the reservation for accepting providing of the product or the like in the work booth 70 can be made.

Here, in a case in which the purpose of use of the work booth 70 for which the reservation is completed by the reservation process is the business use, the CPU 12A grants use authority related to the function of the device provided in the work booth 70, which is not granted in a case in which the purpose of use is the general use. In a case in which the use authority is granted, the business operator can change the amount of light, the lighting pattern, the color, and the like of the lamp of the work booth 70, and a state of the door of the work booth 70, as an example. Note that the "state of the door" described above includes that the door is opened at all times.

Figure 21:
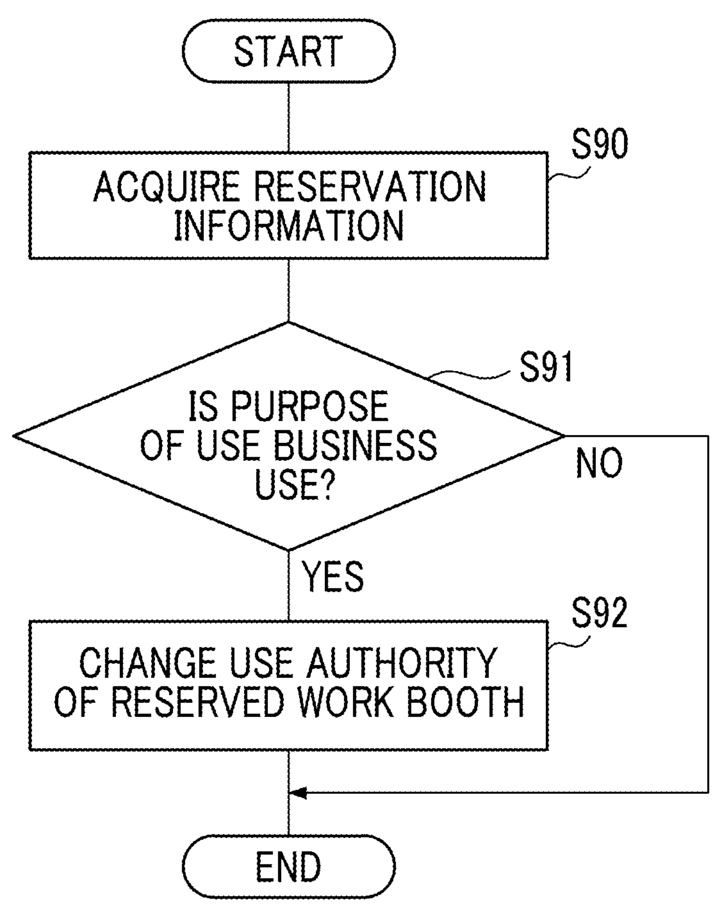
FIG. 21 is a flowchart showing a flow of a change process by the cloud server.

FIG. 21 is a flowchart showing a flow of the change process of whether or not to change the use authority related to the function of the device provided in the work booth 70. The CPU 12A reads out the information processing program from the ROM 12B or the storage 12D, develops the read out information processing program in the RAM 12C, and executes the developed information processing program, so that the change process is performed by the cloud server 12.

In step S90 shown in FIG. 21, the CPU 12A acquires the reservation information of the work booth 70 for which the reservation is accepted. Here, the CPU 12A acquires, as reservation information, at least the purpose of use of the work booth 70. Thereafter, the process proceeds to step S91.

In step S91, the CPU 12A determines whether or not the purpose of use included in the reservation information acquired in step S90 is the business use, and in a case in which the determination is made that the purpose of use is the business use (step S91: YES), the process proceeds to step S92. On the other hand, in a case in which the CPU 12A determines that the purpose of use is not the business use (step S91: NO), the process is terminated.

In step S92, the CPU 12A changes the use authority of the work booth 70 for which the reservation is accepted. Thereafter, the process is terminated.

Here, in a configuration in which the use authority of the work booth 70 is common for all purposes of use (hereinafter referred to as a "comparative configuration"), it is difficult to determine, from the outside, what purpose the work booth 70 is used for. Therefore, in the comparative configuration, even in a case in which the purpose of use of the work booth 70 is the business use, it is difficult to recognize, from the outside, that the work booth 70 provides the product or the like.

On the other hand, according to the present exemplary embodiment, in a case in which the purpose of use is the business use, the use authority related to the function of the device provided in the work booth 70 is granted, so that it is easy to grasp whether the purpose of use is the business use or the general use, as compared with the comparative configuration.

Further, in the present exemplary embodiment, in a case in which the CPU 12A grants the use authority described above, the notification of the advertisement related to the product or the like provided in the work booth 70 using the device provided in the work booth 70 can be performed. As an example, in a case in which the use authority described above is granted, when the reservation start time of the work booth 70 is reached, the CPU 12A displays the advertisement information (see FIG. 15) generated in the reservation process on the outdoor display of the work booth 70. Therefore, according to the present exemplary embodiment, the advertisement of the product or the like provided in the work booth 70 is performed to the outside of the work booth 70 for which the reservation is completed.

Further, in the present exemplary embodiment, in a case in which the accepted purpose of use of the work booth 70 is the business use, the CPU 12A accepts the input of the business type of the product or the like desired to be provided in the work booth 70 in the reservation process. Therefore, according to the present exemplary embodiment, the business type of the product or the like scheduled to be provided in the work booth 70 is grasped before the reservation for the work booth 70 is completed. Then, the CPU 12A accepts the input of the certification information in a case in which the accepted business type requires the predetermined permission for providing the product or the like corresponding to the business type. Thereafter, the CPU 12A completes the reservation for the work booth 70 in a case in which the confirmation can be made from the accepted certification information that the predetermined permission is accepted, and cancels the reservation for the work booth 70 in a case in which the confirmation cannot be made that the predetermined permission is accepted. Therefore, according to the present exemplary embodiment, as compared with a configuration in which the reservation for the work booth 70 is completed without confirming the predetermined permission, the performance of the business use, which requires the predetermined permission, without permission is suppressed.

Further, in the present exemplary embodiment, after the input of the business type of the product or the like desired to be provided in the work booth 70 is accepted, the CPU 12A accepts the input of the facility condition related to the facility in which at least the device provided in the work booth 70 can be designated. Therefore, according to the present exemplary embodiment, the convenience of the user is enhanced as compared with a configuration in which the reservation for the work booth 70 is completed without inputting the facility condition.

Others

In the exemplary embodiment described above, the cloud server 12 is used as an example of the information processing apparatus, but the present invention is not limited to this. With the device provided in the work booth 70 as an example of the information processing apparatus, the process by the cloud server 12 described above may be performed by using a device provided in an individual work booth 70 (for example, the control device 31 provided in the private room 20).

The work booth 70 is not limited to a private room space installed in the vicinity of the station (see FIG. 12) as in the exemplary embodiment described above. As an example, a private room space such as a warehouse, a building, a room of a hotel or the like, or an inside of a vehicle (inside the vehicle) may be used as the work booth 70. Further, the work booth 70 may not have a configuration of a closed space that is closed on all sides. As an example, a configuration may be adopted in which a part of a ceiling surface or a side surface of the work booth 70 is not provided and a part of the work booth 70 is open, a configuration may be adopted in which the door or the side surface of the work booth 70 is not in close contact with the ceiling surface or a bottom surface of the work booth 70 and a part of the work booth 70 is open, or a configuration may be adopted in which the door or the side surface of the work booth 70 is not in close contact with the ceiling or the ground of the installation location of the work booth 70 and a part of the work booth 70 is open.

In the exemplary embodiment described above, two of the private room 20 and the private room 50 are described as an example of the private room that configures the work booth 70, but the number of private rooms that configure the work booth 70 is not limited to this, and may be three or more. Further, the configurations of the private rooms that configure the work booth 70 may be different from each other as in the private room 20 and the private room 50 of the exemplary embodiment described above, or two or more private rooms having the identical configuration may be provided.

In the exemplary embodiment described above, a configuration is adopted in which the reservation for accepting providing of the product or the like in the work booth 70 can be made, but the reservation is not required in the information processing system 10. That is, in the information processing system 10, providing of the product or the like from the business operator in the work booth 70 can be accepted without making the reservation for accepting providing of the product or the like in the work booth 70.

In the exemplary embodiment described above, in a case in which the CPU 12A determines that the reservation hope instruction is not accepted in step S37 shown in FIG. 8, step S55 shown in FIG. 17, and step S72 shown in FIG. 19, the process proceeds to the process of canceling the reservation for the work booth 70. However, the present invention is not limited to this, and a configuration may be adopted in which in a case in which the CPU 12A determines that the reservation hope instruction is not accepted, the process returns to a step in which the search condition for searching for the time zone in which the reservation can be made can be edited.

In the exemplary embodiment described above, the certification information is collated by the CPU 12A in step S39 shown in FIG. 8, but instead of or in addition to this, the certification information may be manually collated.

In the exemplary embodiment described above, in a case in which the image selection button 72A of the certification information input portion 72 shown in FIG. 9 is operated, the selection screen (not shown) of the image is displayed. However, the present invention is not limited to this, and in a case in which the image selection button 72A is operated, a camera function of a device being operated by the user (for example, the portable terminal device 14) may be activated. In this case, in the certification information input portion 72, the image captured by using the camera function is designated as the certification information in the reservation process.

In the exemplary embodiment described above, as the facility condition, an example is described in which the size of the work booth 70 is "xxx square meters or more" and a "kitchen" is provided in the work booth 70, but the facility condition that can be designated is not limited to this. As an example, in addition to the above, as the facility condition, the designation can be made that a "fire extinguisher", "chairs on which a certain number or more of people can sit", or a "desk of a certain size or more" is provided in the work booth 70.

In the exemplary embodiment described above, in a case in which the image selection button 80D of the advertisement content input portion 80B shown in FIG. 14 is operated, the selection screen (not shown) of the image is displayed. In this case, the image that can be selected on the selection screen may be an image prepared in advance on the reservation site side for generating the advertisement information, or may be an image stored in the device being operated by the user (for example, the portable terminal device 14).

In the exemplary embodiment described above, the "title", the "message", the "URL", and the "background image" can be input in the advertisement content input portion 80B shown in FIG. 14, but the number of the types of the advertisement contents that can be input in the advertisement content input portion 80B may be larger than or smaller than the above. As an example, instead of or in addition to the advertisement contents shown in FIG. 14, "business hours" to provide the product or the like, that is, to perform business of the product or the like, "URL of a social networking service (SNS)" and "QR code (registered trademark)" used by the business operator may be input.

In the exemplary embodiment described above, in the flowchart shown in FIG. 17, the input of the product or the like desired to be provided in the work booth 70 is accepted, but the information for which the input is accepted in the reservation process in a case in which the purpose of use of the work booth 70 is the customer use is not limited to this. As an example, in a case in which the purpose of use of the work booth 70 is the customer use, in the reservation process, instead of or in addition to the input of the desired product or the like described above, the input of a name of the business operator, a store name, and the like may be accepted.

In the exemplary embodiment described above, in step S57 shown in FIG. 17, the CPU 12A transmits the reservation information to the business operator. In addition to this, the CPU 12A may transmit the information indicating the cancellation of the reservation to the corresponding business operator even in a case in which the reservation is canceled by the user of the customer use. Further, in a case in which the reservation is canceled by the business operator, the CPU 12A may transmit the information indicating the cancellation of the reservation to the corresponding user of the customer use. Further, in a case in which the reservation is canceled by the business operator, in addition to the information indicating the cancellation of the reservation, the CPU 12A may transmit the information indicating an alternative product or the like to the corresponding user of the customer use.

In the exemplary embodiment described above, in the product-or-the like input portion 82 shown in FIG. 18, the pull-down menu including the identical contents as the business type input portion 71 shown in FIG. 9 is displayed. However, the present invention is not limited to this, and the candidates displayed in the pull-down menu may differ between the business type input portion 71 used in a case of the business use and the product-or-the like input portion 82 used in a case of the customer use.

In the exemplary embodiment described above, in the flowchart shown in FIG. 21, in a case in which the purpose of use of the work booth 70 is the business use, the use authority related to the function of the device provided in the work booth 70 is granted. However, the use authority is not limited to this, and the use authority may be granted even in a case in which the purpose of use is the customer use. In addition, in a case in which the use authority is granted to both the business operator and the user of the customer use, a priority is given to the hope of the business operator when the business operator and the user hope to set different use authority (for example, whether or not the door of the work booth 70 is opened at all times).

In the exemplary embodiment described above, when the reservation start time of the work booth 70 is reached, the CPU 12A displays the advertisement information (see FIG. 15) generated in the reservation process on the outdoor display of the work booth 70. However, the present invention is not limited to this, and in the information processing system 10, a configuration may be adopted in which the advertisement information is displayed on a kiosk terminal 95 (see FIG. 22) capable of communicating with the cloud server 12 provided in the work booth 70.

Figure 22:
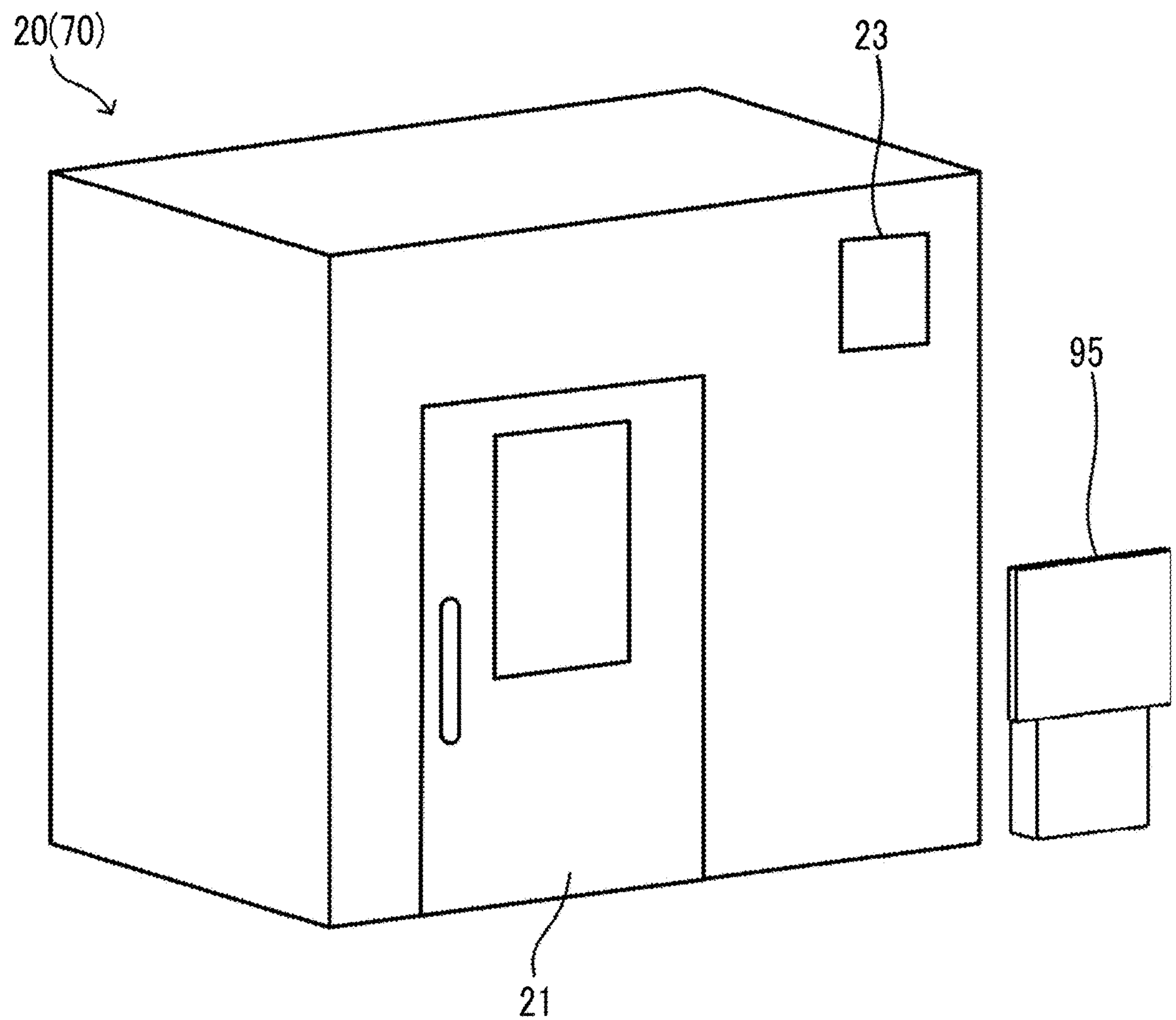
FIG. 22 is a diagram showing a schematic configuration of an outside of the private room.

FIG. 22 is a diagram showing a schematic configuration of an outside of the private room 20. Unlike the exemplary embodiment described above, the kiosk terminal 95 is provided in the private room 20 instead of the outdoor display 22. In this case, when the reservation start time of the private room is reached, the CPU 12A displays the advertisement information generated in the reservation process on the kiosk terminal 95. Note that the present invention is not limited to this, both the outdoor display and the kiosk terminal 95 may be provided in the work booth 70.

In addition, the CPU 12A may share the advertisement information generated in the reservation process with the reservation site and the SNS or the like used by the business operator such that the advertisement information can be viewed from the reservation site, the SNS, and the like.

In the exemplary embodiment described above, in a case in which the reservation start time of the work booth 70 is reached, the advertisement information generated in the reservation process is displayed on the outdoor display of the work booth 70, so that the notification of the advertisement related to the product or the like provided in the work booth 70 is performed. However, the "notification" is not limited to the display on the outdoor display, but may be a voice output of the advertisement information from the speaker, or may be lighting of the lamp in a specific lighting pattern corresponding to the advertisement information.

The CPU 12A may collate the user's purpose of use of the work booth 70 accepted at the time of the reservation with the purpose of use derived from the information from the motion sensor, the camera, and the like provided in the work booth 70, and may perform the process in accordance with a collation result. As an example, the CPU 12A may permit the use of the work booth 70 in a case in which the collation results match. Further, in a case in which the collation results do not match, the CPU 12A may request an additional charge, may perform warning to use the work booth 70 in accordance with the purpose of use, or may perform the notification to leave the work booth 70.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising: a processor configured to: in a reservation process of making a reservation for use of a facility, select from a user interface an input of one purpose of use among a plurality of the purposes of use provided for the facility wherein the plurality of the purposes of use is displayed in a menu of the user interface and comprises a business purpose of use and in accordance with the selected purpose of use, change at least one of a function provided in the reserved facility or information for which input is accepted in the reservation process; and receive an instruction to open a door of the reserved facility or to lock the door of the reserved facility, wherein in a case in which the purpose of use of the facility for which the reservation is selected and completed by the reservation process is a first purpose which is the business purpose of use, accept an input for providing a product or a service associated and in a case in which the purpose of use of the facility for which the reservation is selected and completed by the reservation process is a second purpose which is the personal purpose of use, do not provide any input for selecting the product or the service in the menu.

2. The information processing apparatus according to claim 1 wherein the second purpose further includes a customer use for using the facility as a customer of a user who provides the product or the service in the facility.

3. The information processing apparatus according to claim 1, wherein the processor is configured to: in a case in which the purpose of use of the facility for which the reservation is completed by the reservation process is the first purpose, grant use authority related to a function of a device provided in the facility, which is not granted in a case in which the purpose of use is the second purpose.

4. The information processing apparatus according to claim 2, wherein the processor is configured to: in a case in which the purpose of use of the facility for which the reservation is completed by the reservation process is the first purpose, grant use authority related to a function of a device provided in the facility, which is not granted in a case in which the purpose of use is the second purpose.

5. The information processing apparatus according to claim 3, wherein the processor is configured to: in a case in which the use authority is granted, enable notification of an advertisement related to the product or the service provided in the facility using the device.

6. The information processing apparatus according to claim 4, wherein the processor is configured to: in a case in which the use authority is granted, enable notification of an advertisement related to the product or the service provided in the facility using the device.

7. The information processing apparatus according to claim 1, wherein the processor is configured to: in a case in which the accepted business type requires predetermined permission for providing the product or the service corresponding to the business type, accept input of information for certifying that the permission is accepted; and in a case in which confirmation that the permission is accepted based on the accepted information, complete the reservation for the facility, and in a case in which confirmation that the permission is accepted is not made from the accepted information, cancel the reservation for the facility.

8. The information processing apparatus according to claim 1, wherein the processor is configured to: after the input of the business type is accepted, accept input of a facility condition related to the facility in which at least a device provided in the facility is able to be designated.

* * * * *